US012670762B2

(12) United States Patent
Ching et al.

(10) Patent No.: US 12,670,762 B2
(45) Date of Patent: Jun. 30, 2026

(54) SPACE-EFFICIENT GRAPHICAL USER INTERFACE FOR GAMIFIED SALES

(71) Applicant: Aristocrat Technologies, Inc., Las Vegas, NV (US)

(72) Inventors: Erick Ching, Cedar Park, TX (US); Chad LaGuardia, Las Vegas, NV (US); Jamal Blackwell, Hutto, TX (US); Robert Baker, Clapham North (GB); Jennifer Mizzi, Ewa Beach, HI (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 279 days.

(21) Appl. No.: 18/645,325

(22) Filed: Apr. 24, 2024

(65) Prior Publication Data

US 2024/0273966 A1 Aug. 15, 2024

Related U.S. Application Data

(63) Continuation of application No. 17/663,014, filed on May 11, 2022, now Pat. No. 12,039,827.

(51) Int. Cl.

*G07F 17/32* (2006.01)
*G07F 17/34* (2006.01)

(52) U.S. Cl.

CPC ...... *G07F 17/3211* (2013.01); *G07F 17/3262* (2013.01); *G07F 17/34* (2013.01)

(58) Field of Classification Search

CPC ... G07F 17/3211; G07F 17/3262; G07F 17/34
See application file for complete search history.

(56) References Cited

U.S. PATENT DOCUMENTS

2014/0243072 A1 8/2014 Santini

OTHER PUBLICATIONS

Office Action (Notice of Allowance and Fees Due (PTOL-85)) dated Mar. 4, 2024 for U.S. Appl. No. 17/663,014 (pp. 1-16).

*Primary Examiner* — Yingchuan Zhang
(74) *Attorney, Agent, or Firm* — Weaver Austin Villeneuve & Sampson LLP

(57) ABSTRACT

Graphical user interfaces (GUIs) for providing multi-parameter offers to users are provided. Such GUIs not only efficiently present a particular multi-parameter offer, but also provide insight to the user as to other multi-parameter offers that could have been offered instead, thereby allowing the user to gauge the relative value of the offer being made against the potential other offers that could have been made. Such GUIs are arranged to present the information regarding the offer parameters in a space-efficient manner that allows for such information to be presented for large numbers of potential offers, e.g., 50+ potential offers, in a small display area, e.g., a smartphone screen.

20 Claims, 12 Drawing Sheets

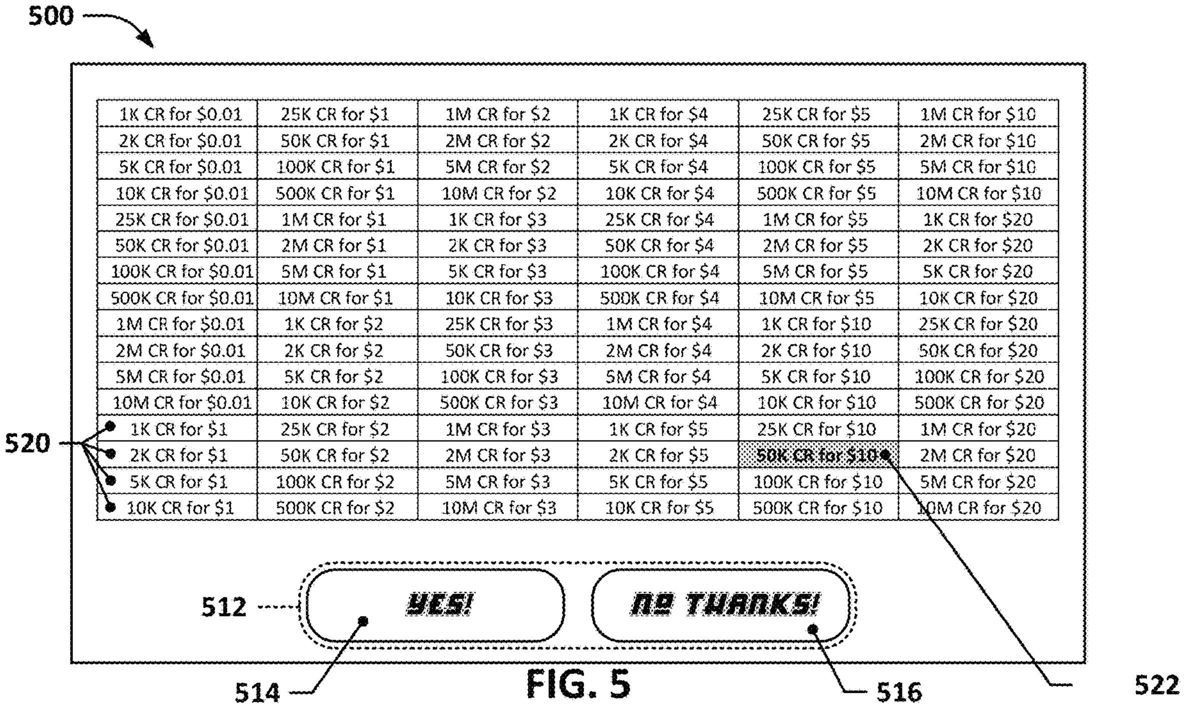

| | | | | | |
|---|---|---|---|---|---|
| 1K CR for $0.01 | 25K CR for $1 | 1M CR for $2 | 1K CR for $4 | 25K CR for $5 | 1M CR for $10 |
| 2K CR for $0.01 | 50K CR for $1 | 2M CR for $2 | 2K CR for $4 | 50K CR for $5 | 2M CR for $10 |
| 5K CR for $0.01 | 100K CR for $1 | 5M CR for $2 | 5K CR for $4 | 100K CR for $5 | 5M CR for $10 |
| 10K CR for $0.01 | 500K CR for $1 | 10M CR for $2 | 10K CR for $4 | 500K CR for $5 | 10M CR for $10 |
| 25K CR for $0.01 | 1M CR for $1 | 1K CR for $3 | 25K CR for $4 | 1M CR for $5 | 1K CR for $20 |
| 50K CR for $0.01 | 2M CR for $1 | 2K CR for $3 | 50K CR for $4 | 2M CR for $5 | 2K CR for $20 |
| 100K CR for $0.01 | 5M CR for $1 | 5K CR for $3 | 100K CR for $4 | 5M CR for $5 | 5K CR for $20 |
| 500K CR for $0.01 | 10M CR for $1 | 10K CR for $3 | 500K CR for $4 | 10M CR for $5 | 10K CR for $20 |
| 1M CR for $0.01 | 1K CR for $2 | 25K CR for $3 | 1M CR for $4 | 1K CR for $10 | 25K CR for $20 |
| 2M CR for $0.01 | 2K CR for $2 | 50K CR for $3 | 2M CR for $4 | 2K CR for $10 | 50K CR for $20 |
| 5M CR for $0.01 | 5K CR for $2 | 100K CR for $3 | 5M CR for $4 | 5K CR for $10 | 100K CR for $20 |
| 10M CR for $0.01 | 10K CR for $2 | 500K CR for $3 | 10M CR for $4 | 10K CR for $10 | 500K CR for $20 |
| 1K CR for $1 | 25K CR for $2 | 1M CR for $3 | 1K CR for $5 | 25K CR for $10 | 1M CR for $20 |
| 2K CR for $1 | 50K CR for $2 | 2M CR for $3 | 2K CR for $5 | 50K CR for $10 | 2M CR for $20 |
| 5K CR for $1 | 100K CR for $2 | 5M CR for $3 | 5K CR for $5 | 100K CR for $10 | 5M CR for $20 |
| 10K CR for $1 | 500K CR for $2 | 10M CR for $3 | 10K CR for $5 | 500K CR for $10 | 10M CR for $20 |

FIG. 5

SPACE-EFFICIENT GRAPHICAL USER INTERFACE FOR GAMIFIED SALES

RELATED APPLICATION(S)

This application is a continuation application under 35 U.S.C. § 120 of U.S. patent application Ser. No. 17/663,014, filed May 11, 2022, and titled "SPACE-EFFICIENT GRAPHICAL USER INTERFACE FOR GAMIFIED SALES," which is hereby incorporated herein by reference in its entirety and for all purposes.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

In some contexts, such games may be playable in a "social" context in which a social gaming currency is used. Such a social gaming currency may be purchased by players, but may not be redeemed for real currency. Discussed herein are systems and techniques for providing offers regarding such transactions (or other transactions) via a space-efficient and intuitive GUI.

SUMMARY

Discussed herein are systems for providing a graphical user interface (GUI) that may be used to present users with an offer that the user may accept or decline. The offers that the user is presented with may be composed of multiple parameters, each of which may be selected from a corresponding set of parameters (or graphical indicators representing such parameters) and each of which may also be in a subset of parameters (or graphical indicators representing such parameters) drawn from that corresponding set of parameters (or graphical indicators representing such parameters). However, the GUI that the user is presented with is designed to not only inform the user of what the parameters in the offer are, but also what the parameters from the subsets of parameters are that do not form part of the offer. Thus, the user is presented with information that not only indicates what the offer is, but also what at least some of the other offers are that could have potentially been offered. This gives the user a sense of how the offer being made compares to other offers that could have been made. Such a GUI may encourage users to accept offers when they are presented with information that indicates that the offer being made is favorable compared to other offers that could have been made.

The GUIs presented herein provide such information in an intuitive and compact format that allows users to rapidly determine what the offer is and how the offer compares to other offers that could have been made. They thus address the technical problem of how to inform users of a large number of potential offers and one offer among that large number of offers that is actually being made, but without doing so in a visually cluttered manner that is difficult and off-putting for a user to interpret.

Such GUIs may be particularly useful in the context of offers for "soft" assets, such as social gaming currency, game enhancements, skins, wallpapers, and other digital items that may have somewhat arbitrary value and may thus be suitable for being offered to users via a flexible offer framework.

Various implementations will become apparent from the discussion below and the examples provided; the above description is not intended to be limiting, and other implementations will be apparent from the discussion herein that are also considered to be within the scope of this disclosure. This disclosure, however, is to be understood to be directed to at least the following implementations.

In some implementations, a system may be provided that includes one or more displays, one or more processors, and one or more memories. The one or more memories may store computer-executable instructions for controlling the one or more processors to cause a plurality of subsets of graphical indicators to be displayed on the one or more displays, where each subset of graphical indicators may include graphical indicators included in a corresponding set of graphical indicators, the plurality of subsets of graphical indicators may include at least a first subset of the graphical indicators included in a first set of graphical indicators and a second subset of graphical indicators included in a second set of graphical indicators, each subset of graphical indicators may include a corresponding plurality of graphical indicators, and each graphical indicator may represent a parameter. The instructions may further include instructions for controlling the one or more processors to select one graphical indicator from each set of graphical indicators, where the graphical indicator selected from each set of graphical indicators is also in the subset of graphical indicators in that set of graphical indicators, cause the selected graphical indicator from each set of graphical indicators to be indicated on the one or more display devices as being selected, receive first user input information indicating whether or not a user accepts a parameter set indicated by the selected graphical indicators, and perform, responsive to receipt of the first user input information indicating that the user accepted the parameter set indicated by the selected graphical indicators, one or more operations based on the parameters indicated by the selected graphical indicators.

In some such implementations, at least one of the subsets of graphical indicators may be an improper subset of the corresponding set of graphical indicators. In some further such implementations, each subset of graphical indicators may be an improper subset of the corresponding set of graphical indicators.

In some implementations, at least one of the subsets of graphical indicators may be a proper subset of the corresponding set of graphical indicators. In some further such implementations, each subset of graphical indicators may be a proper subset of the corresponding set of graphical indicators.

In some implementations, the one or more memories may further store computer-executable instructions for further controlling the one or more processors to: receive a user selection input indicating a selection of one of the graphical indicators in the first subset of graphical indicators, and randomly select the selected graphical indicator in the second set of graphical indicators, wherein the selected graphical indicator in the second set of graphical indicators is indicated as being selected only after the user selection input is received.

In some implementations, the one or more memories may further store computer-executable instructions for further controlling the one or more processors to: randomly select the selected graphical indicator in the first set of graphical indicators, and randomly select the selected graphical indicator in the second set of graphical indicators.

In some implementations, the one or more memories may further store computer-executable instructions for further controlling the one or more processors to, for each selected graphical indicator, select that graphical indicator randomly.

In some implementations, for each set of graphical indicators, at least some of the graphical indicators of that set of graphical indicators may be different from one another and each may represent a different value of a corresponding parameter.

In some implementations, for each set of graphical indicators, all of the graphical indicators of that set of graphical indicators may be different from one another and may each represent a different value of a corresponding parameter.

In some implementations, at least some of the graphical indicators of the first set of graphical indicators may each represent a different quantity of a first item, and at least some of the graphical indicators of the second set of graphical indicators may each represent a different quantity of a second item.

In some implementations, the performing, responsive to receipt of the first user input information indicating that the user accepted the parameter set indicated by the selected graphical indicators, the one or more operations based on the parameters indicated by the selected graphical indicators may include, when the selected parameter set includes a first parameter corresponding to a first quantity of a first item and a second parameter corresponding to a second quantity of a second item, providing an amount of the first item based on the first quantity of the first item in exchange for an amount of the second item based on the second quantity of the second item.

In some such implementations, the graphical indicators in the first set of graphical indicators may represent different quantities of social gaming credits and the graphical indicators in the second set of graphical indicators may represent different quantities of real currency, and the performing, responsive to receipt of the first user input information indicating that the user accepted the parameter set indicated by the selected graphical indicators, the one or more operations based on the parameters indicated by the selected graphical indicators may include crediting a social gaming account associated with a user with an amount of social gaming credits indicated by the selected graphical indicator of the first subset of graphical indicators and debiting an amount of real currency indicated by the selected graphical indicator of the second subset of graphical indicators from a real currency account associated with the user.

In some implementations, the graphical indicators in each subset of graphical indicators may be arranged along a corresponding axis, and the axes may be parallel to one another.

In some implementations, each subset of graphical indicators may be associated with a displayed graphic of a segmented wheel or ring, and the graphical indicators in each subset of graphical indicators may each correspond with a different segment of the segmented wheel or ring associated with that subset of graphical indicators.

In some implementations, the one or more memories may further store computer-executable instructions for further controlling the one or more processors to cause a first set of controls to be displayed on the one or more displays, where the first set of controls includes: a first control that, when selected, causes the first user input information indicating that the user accepted the parameter set indicated by the selected graphical indicators to be generated, and a second control that, when selected, causes first user input information indicating that the user rejected the parameter set indicated by the selected graphical indicators to be generated.

In some such implementations, the first set of controls may further include a third control that, when selected, causes first user input information indicating that the user rejected the parameter set indicated by the selected graphical indicators and has also requested a new selection of one or more graphical indicators to be generated, and the one or more memories may further store computer-executable instructions for further controlling the one or more processors to, responsive to receipt of the first user input information indicating that the user rejected the parameter set indicated by the selected graphical indicators and has requested the new selection of one or more graphical indicators to be generated, cause a new selection of a graphical indicator from one or more of the sets of graphical indicators to be made.

In some additional such implementations, the one or more memories may further store computer-executable instructions for further controlling the one or more processors to cause a first amount to be debited from an account associated with the user in association with causing the new selection of the one or more graphical indicators to be made.

In some implementations, the system may include a first device and a second device, the first device may include the one or more displays, the one or more processors may include at least one processor in the first device and at least one processor in the second device, the one or more memories may include at least one memory device in the first device and at least one memory device in the second device, the memories in the first device and the second device, collectively, may store the computer-executable instructions for controlling the one or more processors, and the one or more memories of the second device may store the computer-executable instructions for controlling the one or more processors of the second device to select the one graphical indicator from each of the sets of the graphical indicators and to send information regarding the selected graphical indicators to the first device.

In some implementations, one or more computer-readable media may be provided that store computer-executable instructions for controlling one or more processors to cause a plurality of subsets of graphical indicators to be displayed on one or more displays, where each subset of graphical indicators may include graphical indicators included in a corresponding set of graphical indicators, the plurality of subsets of graphical indicators may include at least a first subset of graphical indicators included in a first set of graphical indicators and a second subset of graphical indicators included in a second set of graphical indicators, each subset of graphical indicators may include a corresponding plurality of graphical indicators, and each graphical indicator may represent a parameter. The computer-executable instructions may further include computer-executable instructions for controlling the one or more processors to select one graphical indicator from each set of graphical indicators, where the graphical indicator selected from each set of graphical indicators is also in the subset of graphical indicators in that set of graphical indicators, cause the selected graphical indicator from each set of graphical indicators to be indicated on the one or more display devices as being selected, receive first user input information indicating whether or not a user accepts a parameter set indicated by the selected graphical indicators, and perform, responsive to receipt of the first user input information indicating that the user accepted the parameter set indicated by the selected graphical indicators, one or more operations based on the parameters indicated by the selected graphical indicators.

In some such implementations, at least one of the subsets of graphical indicators may be an improper subset of the corresponding set of graphical indicators. In some further such implementations, each subset of graphical indicators may be an improper subset of the corresponding set of graphical indicators.

In some implementations, at least one of the subsets of graphical indicators may be a proper subset of the corresponding set of graphical indicators. In some further such implementations, each subset of graphical indicators may be a proper subset of the corresponding set of graphical indicators.

In some implementations, the one or more computer-readable media may further store additional computer-executable instructions for further controlling the one or more processors to: receive a user selection input indicating a selection of one of the graphical indicators in the first subset of graphical indicators, and randomly select the selected graphical indicator in the second set of graphical indicators, wherein the selected graphical indicator in the second set of graphical indicators is indicated as being selected only after the user selection input is received.

In some implementations, the one or more computer-readable media may further store additional computer-executable instructions for further controlling the one or more processors to: randomly select the selected graphical indicator in the first set of graphical indicators, and randomly select the selected graphical indicator in the second set of graphical indicators.

In some implementations, the one or more computer-readable media may further store additional computer-executable instructions for further controlling the one or more processors to, for each selected graphical indicator, select that graphical indicator randomly.

In some implementations, for each set of graphical indicators, at least some of the graphical indicators of that set of graphical indicators may be different from one another and may each represent a different value of a corresponding parameter. In some further implementations, for each set of graphical indicators, all of the graphical indicators of that set of graphical indicators may be different from one another and may each represent a different value of a corresponding parameter.

In some implementations, at least some of the graphical indicators of the first set of graphical indicators may each represent a different quantity of a first item, and at least some of the graphical indicators of the second set of graphical indicators may each represent a different quantity of a second item.

In some implementations, the performing, responsive to receipt of the first user input information indicating that the user accepted the parameter set indicated by the selected graphical indicators, the one or more operations based on the parameters indicated by the selected graphical indicators may include, when the selected parameter set includes a first parameter corresponding to a first quantity of a first item and a second parameter corresponding to a second quantity of a second item, providing an amount of the first item based on the first quantity of the first item in exchange for an amount of the second item based on the second quantity of the second item.

In some implementations, the graphical indicators in the first set of graphical indicators may represent different quantities of social gaming credits and the graphical indicators in the second set of graphical indicators may represent different quantities of real currency, and the performing, responsive to receipt of the first user input information indicating that the user accepted the parameter set indicated by the selected graphical indicators, the one or more operations based on the parameters indicated by the selected graphical indicators may include crediting a social gaming account associated with a user with an amount of social gaming credits indicated by the selected graphical indicator of the first subset of graphical indicators and debiting an amount of real currency indicated by the selected graphical indicator of the second subset of graphical indicators from a real currency account associated with the user.

In some implementations, the graphical indicators in each subset of graphical indicators may be arranged along a corresponding axis, and the axes may be parallel to one another.

In some implementations, each subset of graphical indicators may be associated with a displayed graphic of a segmented wheel or ring, and the graphical indicators in each subset of graphical indicators may each correspond with a different segment of the segmented wheel or ring associated with that subset of graphical indicators.

In some implementations, the one or more computer-readable media may further store additional computer-executable instructions for further controlling the one or more processors to cause a first set of controls to be displayed on the one or more displays, where the first set of controls includes: a first control that, when selected, causes the first user input information indicating that the user accepted the parameter set indicated by the selected graphical indicators to be generated, and a second control that, when selected, causes first user input information indicating that the user rejected the parameter set indicated by the selected graphical indicators to be generated.

In some such implementations, the first set of controls may further include a third control that, when selected, causes first user input information indicating that the user rejected the parameter set indicated by the selected graphical indicators and has also requested a new selection of one or more graphical indicators to be generated, and the one or more computer-readable media may further store additional computer-executable instructions for further controlling the one or more processors to, responsive to receipt of the first user input information indicating that the user rejected the parameter set indicated by the selected graphical indicators and has requested the new selection of one or more graphical indicators to be generated, cause a new selection of a graphical indicator from one or more of the sets of graphical indicators to be made.

In some additional such implementations, the one or more computer-readable media may further store additional computer-executable instructions for further controlling the one or more processors to cause a first amount to be debited from an account associated with the user in association with causing the new selection of one or more graphical indicators to be made.

In some implementations, the computer-executable instructions may include first instructions for controlling a first set of the one or more processors located in a first device and second instructions for controlling a second set of the one or more processors located in a second device, where the first device includes the one or more displays and the second instructions include instructions for controlling the second set of one or more processors to select the one graphical indicator from each set of graphical indicators.

In some implementations, a method may be provided that includes causing, by the one or more processors, a plurality of subsets of graphical indicators to be displayed on one or more displays, where each subset of graphical indicators may include graphical indicators included in a corresponding set of graphical indicators, the plurality of subsets of graphical indicators may include at least a first subset of graphical indicators included in a first set of graphical indicators and a second subset of graphical indicators included in a second set of graphical indicators, each subset of graphical indicators may include a corresponding plurality of graphical indicators, and each graphical indicator may represent a parameter. The method may further include selecting, by the one or more processors, one graphical indicator from each set of graphical indicators, where the graphical indicator selected from each set of graphical indicators is also in the subset of graphical indicators in that set of graphical indicators, causing, by the one or more processors, the selected graphical indicator from each set of graphical indicators to be indicated on the one or more display devices as being selected, receiving, by the one or more processors, first user input information indicating whether or not a user accepts a parameter set indicated by the selected graphical indicators, and performing, by the one or more processors and responsive to receipt, by the one or more processors, of the first user input information indicating that the user accepted the parameter set indicated by the selected graphical indicators, one or more operations based on the parameters indicated by the selected graphical indicators.

In some such implementations, at least one of the subsets of graphical indicators may be an improper subset of the corresponding set of graphical indicators. In some further such implementations, each subset of graphical indicators may be an improper subset of the corresponding set of graphical indicators.

In some implementations, at least one of the subsets of graphical indicators may be a proper subset of the corresponding set of graphical indicators. In some further such implementations, each subset of graphical indicators may be a proper subset of the corresponding set of graphical indicators.

In some implementations, the method may further include receiving, by the one or more processors, a user selection input indicating a selection of one of the graphical indicators in the first subset of graphical indicators, and randomly selecting, by the one or more processors, the selected graphical indicator in the second set of graphical indicators, wherein the selected graphical indicator in the second set of graphical indicators is indicated as being selected only after the user selection input is received.

In some implementations, the method may further include randomly selecting, by the one or more processors, the selected graphical indicator in the first set of graphical indicators, and randomly selecting, by the one or more processors, the selected graphical indicator in the second set of graphical indicators.

In some implementations, the method may further include, for each selected graphical indicator, selecting, by the one or more processors, that graphical indicator randomly.

In some implementations, for each set of graphical indicators, at least some of the graphical indicators of that set of graphical indicators may be different from one another and may each represent a different value of a corresponding parameter.

In some implementations, for each set of graphical indicators, all of the graphical indicators of that set of graphical indicators may be different from one another and may each represent a different value of a corresponding parameter.

In some implementations, at least some of the graphical indicators of the first set of graphical indicators may each represent a different quantity of a first item, and at least some of the graphical indicators of the second set of graphical indicators may each represent a different quantity of a second item.

In some implementations, the performing, responsive to receipt of the first user input information indicating that the user accepted the parameter set indicated by the selected graphical indicators, the one or more operations based on the parameters indicated by the selected graphical indicators may include, when the selected parameter set includes a first parameter corresponding to a first quantity of a first item and a second parameter corresponding to a second quantity of a second item, providing an amount of the first item based on the first quantity of the first item in exchange for an amount of the second item based on the second quantity of the second item.

In some implementations, the graphical indicators in the first set of graphical indicators may represent different quantities of social gaming credits and the graphical indicators in the second set of graphical indicators may represent different quantities of real currency, and the performing, responsive to receipt of the first user input information indicating that the user accepted the parameter set indicated by the selected graphical indicators, the one or more operations based on the parameters indicated by the selected graphical indicators may include crediting a social gaming account associated with a user with an amount of social gaming credits indicated by the selected graphical indicator of the first subset of graphical indicators and debiting an amount of real currency indicated by the selected graphical indicator of the second subset of graphical indicators from a real currency account associated with the user.

In some implementations of the method, the graphical indicators in each subset of graphical indicators may be arranged along a corresponding axis, and the axes may be parallel to one another.

In some implementations of the method, each subset of graphical indicators may be associated with a displayed graphic of a segmented wheel or ring, and the graphical indicators in each subset of graphical indicators may each correspond with a different segment of the segmented wheel or ring associated with that subset of graphical indicators.

In some implementations, the method may further include causing, by the one or more processors, a first set of controls to be displayed on the one or more displays, where the first set of controls includes a first control that, when selected, causes the first user input information indicating that the user accepted the parameter set indicated by the selected graphical indicators to be generated, and a second control that, when selected, causes first user input information indicating that the user rejected the parameter set indicated by the selected graphical indicators to be generated.

In some such implementations, the first set of controls may further include a third control that, when selected, causes first user input information indicating that the user rejected the parameter set indicated by the selected graphical indicators and has also requested a new selection of one or more of the graphical indicators to be generated, and the method may further include, responsive to receipt of the first user input information by the one or more processors indicating that the user rejected the parameter set indicated by the selected graphical indicators and has requested the new selection of the one or more graphical indicators to be generated, causing, by the one or more processors, a new selection of a graphical indicator from one or more of the sets of graphical indicators to be made.

In some implementations, the method may further include causing, by the one or more processors, a first amount to be debited from an account associated with the user in association with causing the new selection of the one or more graphical indicators to be made.

In some implementations, the one or more processors may include one or more first processors located in a first device and one or more processors located in a second device, the first device may include the one or more displays, and the method may further include selecting the one graphical indicator from each set of graphical indicators using the one or more second processors in the second device.

BRIEF DESCRIPTION OF THE DRAWINGS

FIG. 5 depicts an example of another, less useful GUI for providing an overview of an offer and potential offers that could have been made.

Figure 1:
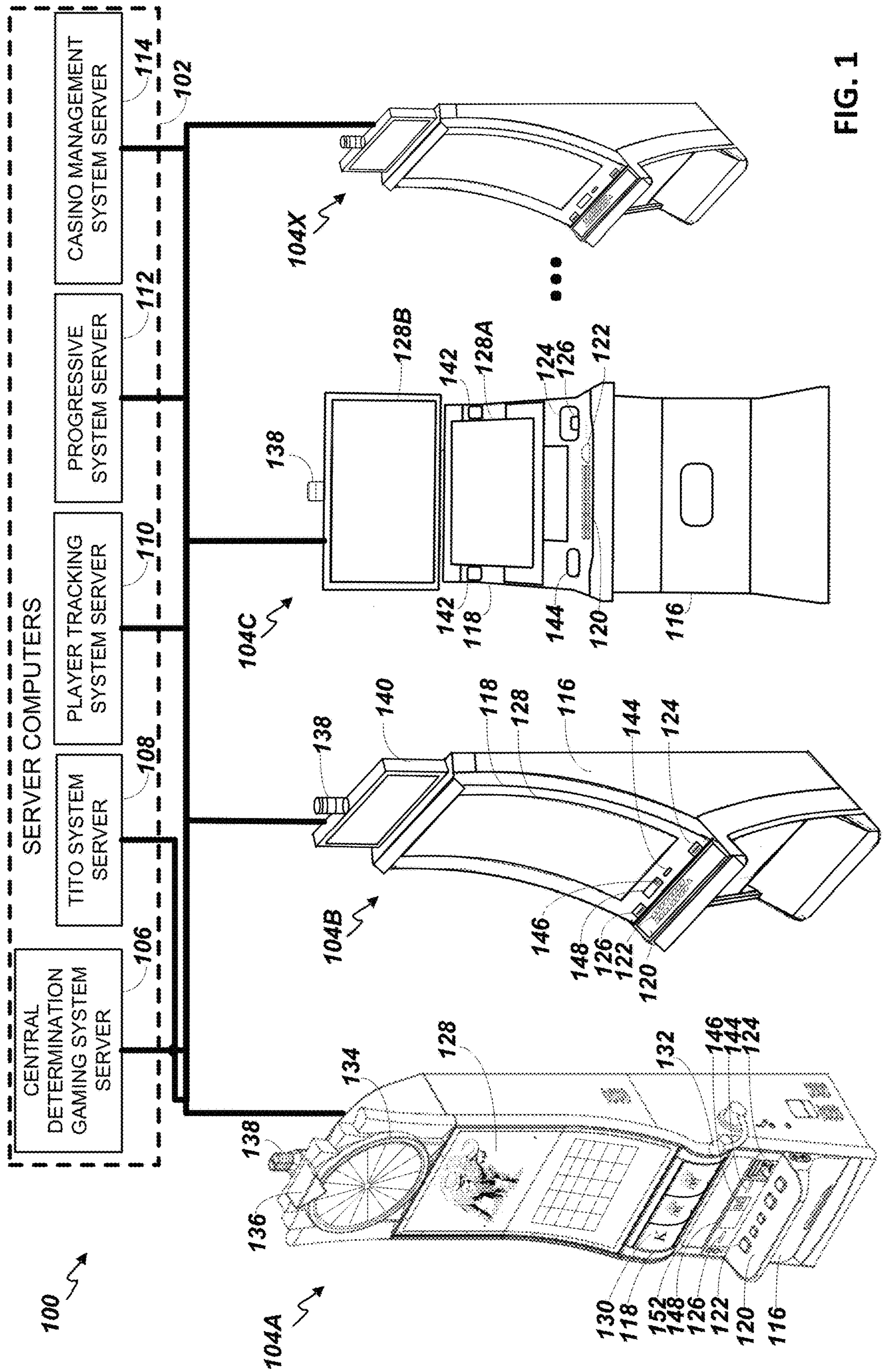
FIG. 1 is an exemplary diagram showing several EGMs networked with various gaming related servers.

The Figures are provided for the purpose of providing examples and clarity regarding various aspects of this disclosure, and are not intended to be limiting.

DETAILED DESCRIPTION

As discussed above, the systems and techniques discussed herein may be used to provide a graphical user interface (GUI) that may be used to present users with an offer that the user may accept or decline. Discussed herein are systems for providing a graphical user interface (GUI) that may be used to present users with an offer that the user may accept or decline. The offers that the user is presented with may be composed of multiple parameters, each of which may be selected from a corresponding set of parameters (or graphical indicators representing such parameters) and each of which may also be in a subset of parameters (or graphical indicators representing such parameters) drawn from that corresponding set of parameters (or graphical indicators representing such parameters). However, the GUI that the user is presented with is designed to not only inform the user of what the parameters in the offer are, but also what the parameters from the subsets of parameters are that do not form part of the offer. Thus, the user is presented with information that not only indicates what the offer is, but also what at least some of the other offers are that could have potentially been offered. This gives the user a sense of how the offer being made compares to other offers that could have been made. Such a GUI may encourage users to accept offers when they are presented with information that indicates that the offer being made is favorable compared to other offers that could have been made.

Such GUIs may present multiple subsets of graphical indicators, each subset of graphical indicators including a plurality of graphical indicators from a set of graphical indicators. The graphical indicators in each set of graphical indicators may each represent a corresponding parameter value for a parameter of an offer. In presenting such a GUI, one graphical indicator from each subset of graphical indicators may be indicated as having been selected, e.g., randomly, by the GUI, with the selected graphical indicators conveying the parameters of an offer. The unselected graphical indicators in the subsets of graphical indicators simultaneously convey to the user at least some, if not all, of the other potential offers that could have been made.

The GUIs presented herein provide such information in an intuitive and compact format that allows users to rapidly determine what the offer is and how the offer compares to other offers that could have been made. They thus address the technical problem of how to inform users of a large number of potential offers and one offer among that large number of offers that is actually being made, but without doing so in a visually cluttered manner that is difficult and off-putting for a user to interpret. Such GUIs are particularly beneficial in the context of smartphones and other devices in which the size of the display screen is quite small.

Such GUIs may be particularly useful in the context of offers for "soft" assets, such as social gaming currency, game enhancements, skins, wallpapers, and other digital items that may have somewhat arbitrary value and may thus be suitable for being offered to users via a flexible offer framework.

The following discussion provides overall context for gaming machines that may be applicable to both social and non-social gaming contexts. Following this overview, a more focused discussion of the GUI concepts discussed above is provided.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
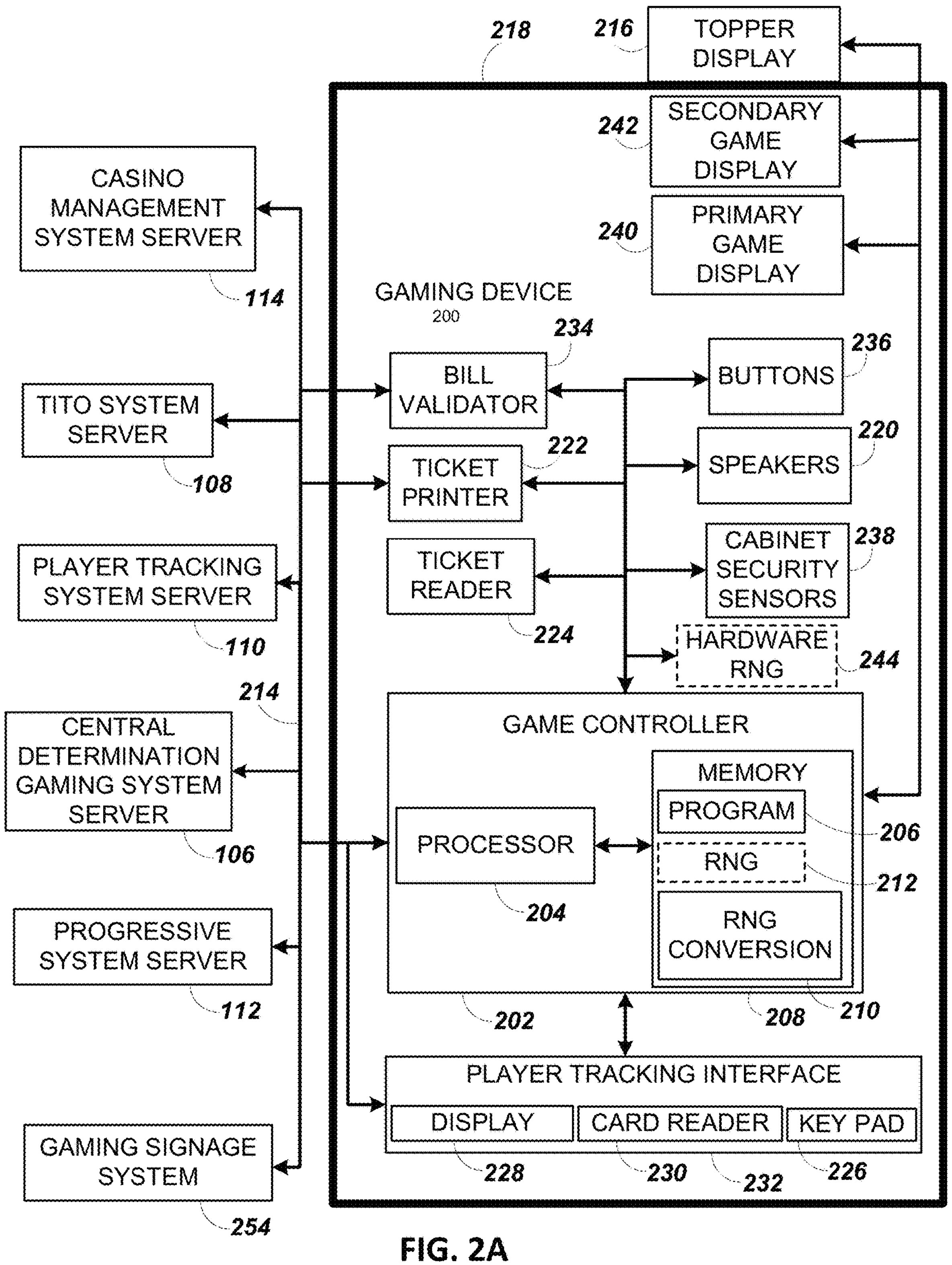
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
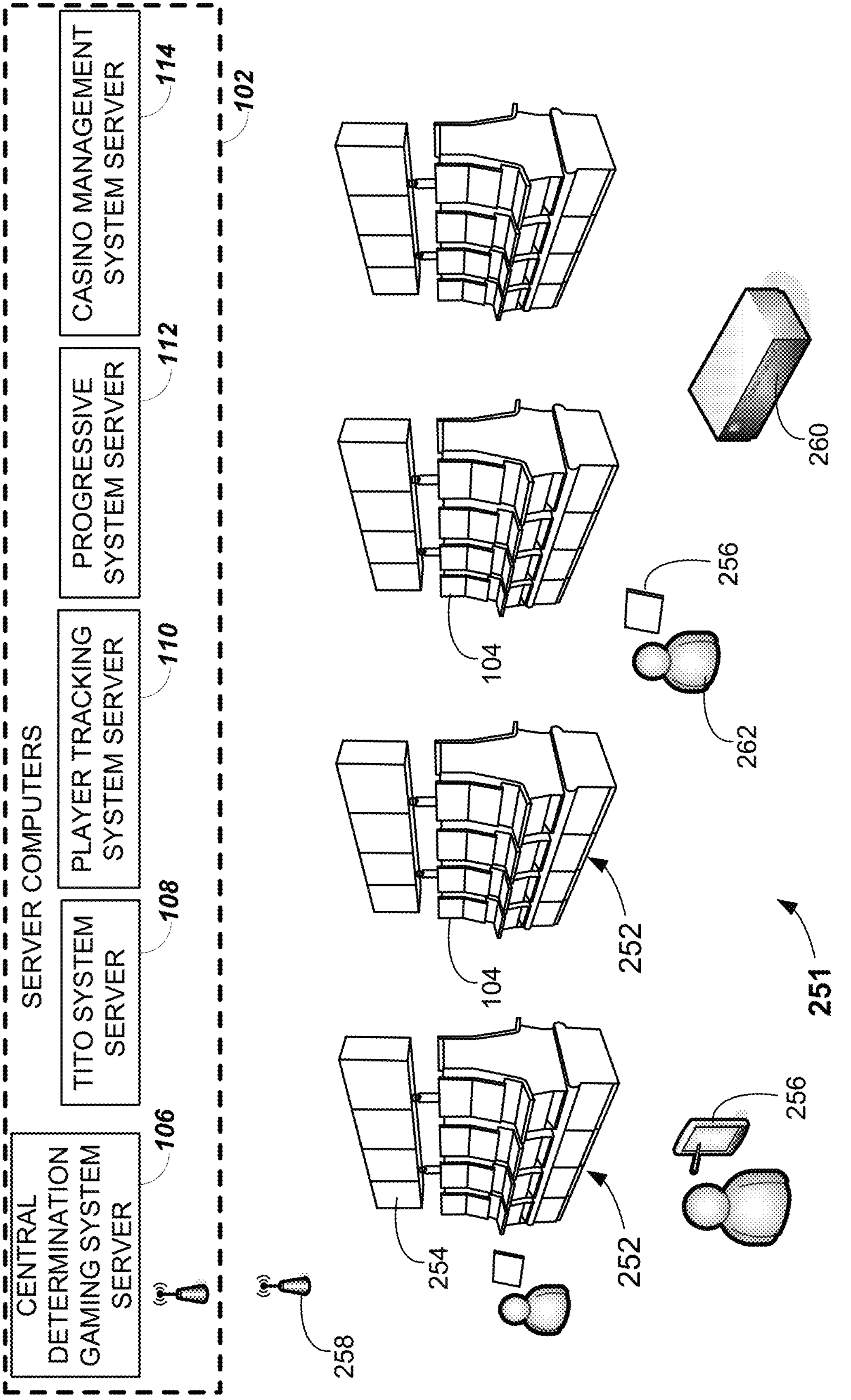
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
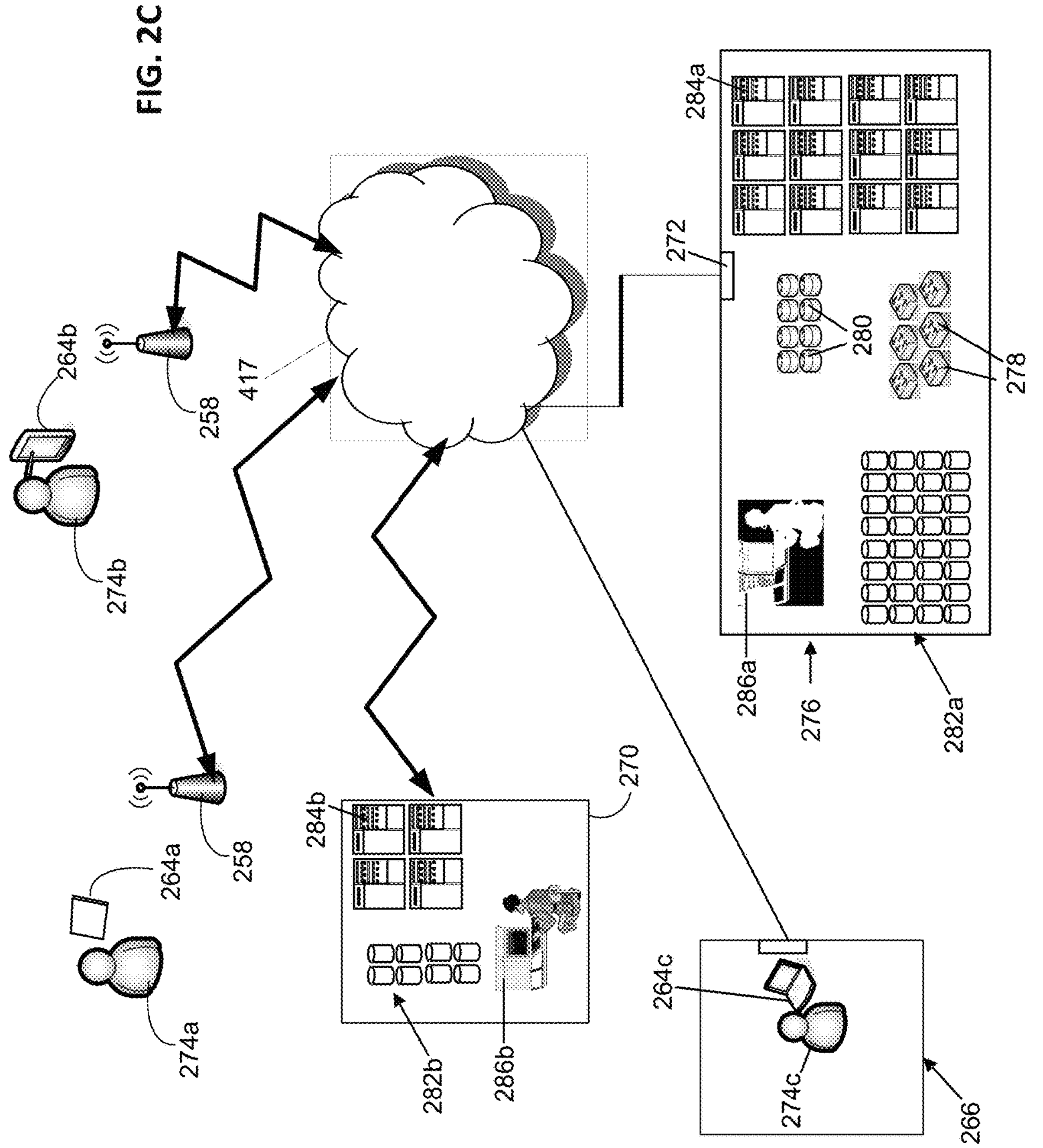
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 may, for example, be a remote gaming server (RGS) or similar system in some implementations. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
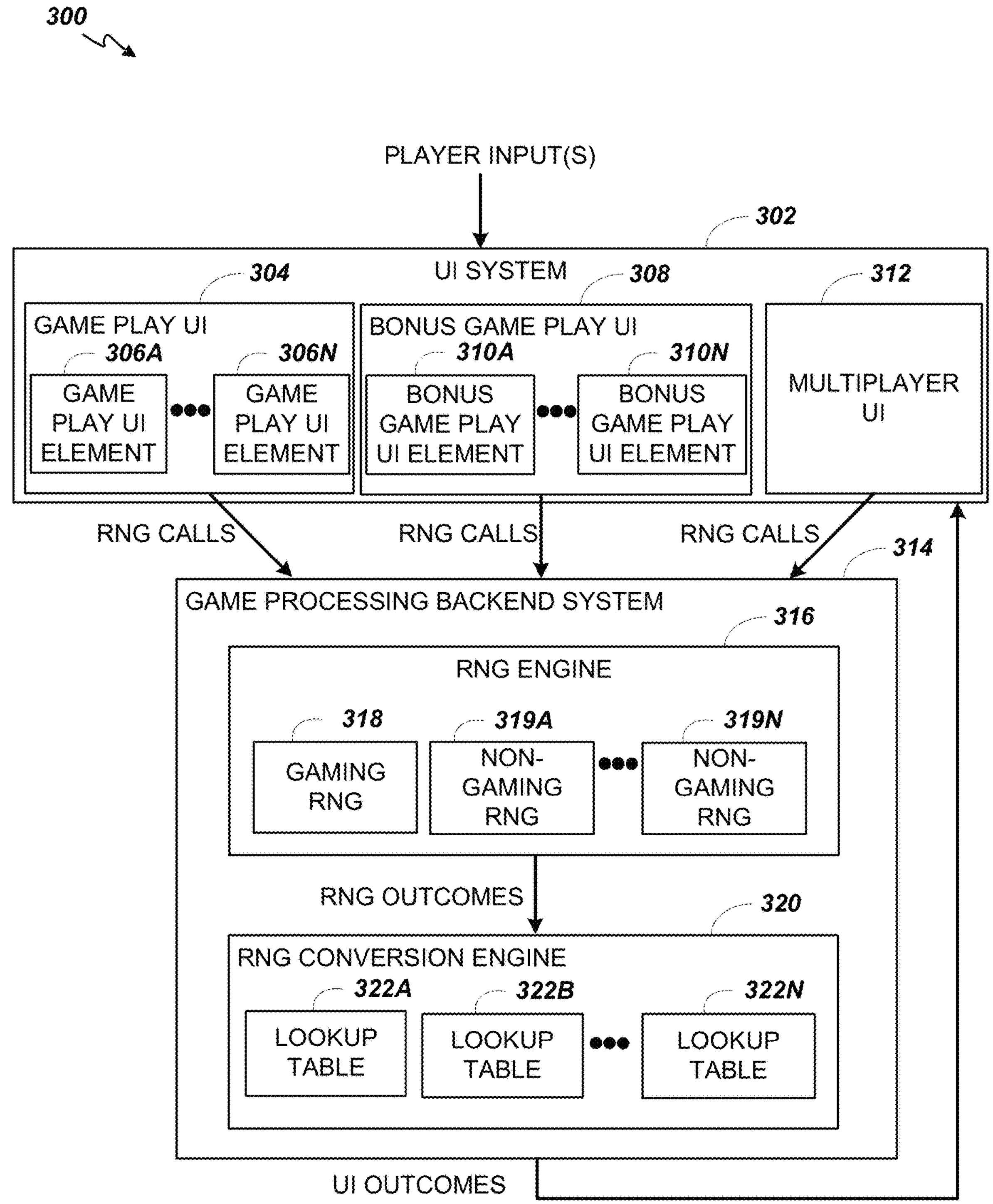
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

In some instances, systems and games such as the above may, for example, be provided in a "social" gaming context, e.g., offering gaming experiences in which a "social gaming currency" is used to play such games. Generally speaking, a social gaming currency is an artificial currency that can be purchased and used to play games of chance but which cannot be redeemed for actual money. Thus, once a person has, for example, purchased an amount of social gaming currency with an amount of real currency, the person can use that social gaming currency to play social games, e.g., slot machines in which the social currency is used to purchase credits and the winnings from such slot machines are paid out in the social gaming currency, but cannot cash the social gaming currency out into real currency again. It is, in that sense, a one-way transaction. As a result, the exchange rate of real currency for social gaming currency is not subject to real-world financial constraints, and the offeror of the social gaming currency may set whatever exchange rate they wish for such a social gaming currency. Accordingly, an operator of a social gaming currency system may elect to potentially offer amounts of such social gaming currency at wildly different price points at different times to users.

For example, in some instances, users of social gaming systems may play games using social gaming currency on their smartphones. In such instances, the user may launch an application on the smartphone that brings up a lobby GUI allowing the user to engage in transactions to purchase the social gaming currency that the system uses or to select between multiple social gaming applications, e.g., different slot machine games, that all use the social gaming currency. The provider of such a system may, for example, configure such an application to present a daily offer to such users, e.g., the first time that the user launches the application in question (or brings it to the foreground) each day, the application may first present a GUI such as are described herein, offering to allow the user to purchase a particular amount of social gaming currency for a particular amount of real currency. The user may then either decline the offer or accept it. In the latter case, the application may initiate a transaction, e.g., via a credit card or other financial payment system, to debit the offered real currency amount from an account associated with the user, e.g., a financial account, and to credit the offered social gaming currency amount to a social gaming account associated with the user. It will be understood that in the context of this application, "real currency" may refer to a national currency (a currency backed by a national bank of a country, e.g., the Federal Reserve) or a cryptographic currency (such as Bitcoin, Ethereum, etc.), and that accounts or systems that may be used to conduct transactions of real currency may include, for example, bank accounts, credit card accounts, debit card accounts, and/or digital or cryptographic wallet systems.

In other implementations, the items being offered may not be social gaming currency amounts but may instead be digital assets, e.g., skins, game enhancements, avatars, etc., for use in a social gaming system. It will be apparent that the offers presented by the GUIs discussed herein are not limited to the above examples but may extend to any offer to exchange a quantity of one type of item for a quantity of another type of item.

Figure 4A:
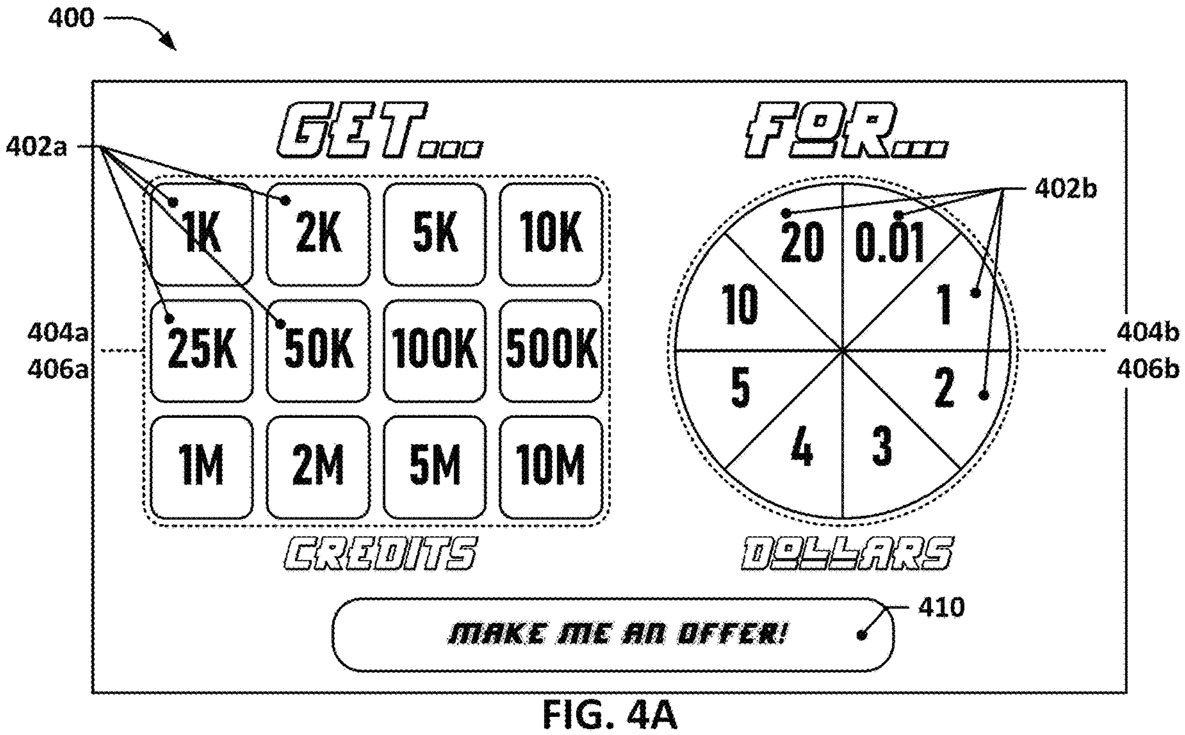
FIGS. 4A and 4B depict an example GUI for providing an overview of an offer and potential offers that could have been made.
Figure 4B:
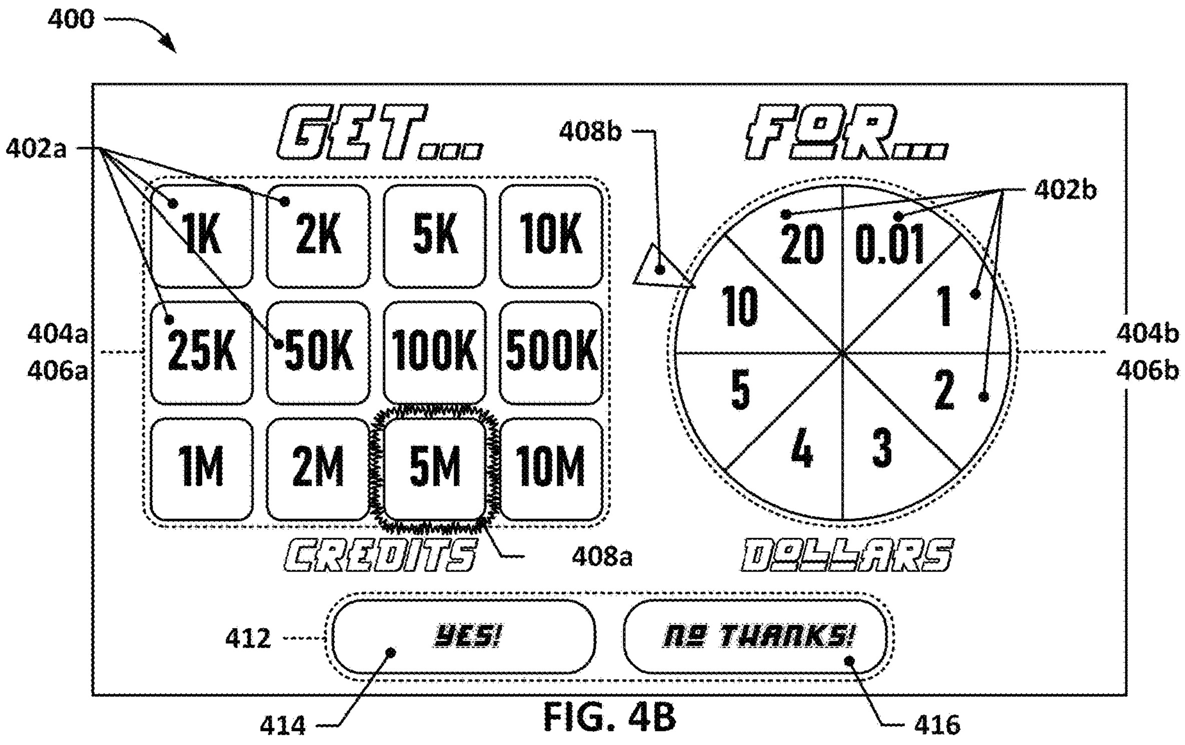

FIGS. 4A and 4B depict an example GUI 400 that implements such concepts. As can be seen in FIG. 4A, the GUI 400 includes a first set 404*a* of graphical indicators 402*a* and a second set 404*b* of graphical indicators 402*b*. A first subset 406*a* of the graphical indicators 402*a* that are in the first set 404*a* of graphical indicators 402*a* is shown on the GUI 400, as is a second subset 406*b* of the graphical indicators 402*b* that are in the second set 404*b* of graphical indicators 402*b*. In this example, the first subset 406*a* of graphical indicators 402*a* is an improper subset of the first set 404*a* of graphical indicators 402*a*, and the second subset 406*b* of graphical indicators is an improper subset of the second set 404*b* of graphical indicators 402*b*.

The term "subset" in this application is to be understood to be a set that is composed of members of another set. A subset may have fewer members than the other set or the same members as the other set. A subset that has fewer members than the set that it is a subset of may be referred to herein as a "proper subset." A subset that has the same members as the set it is a subset of may be referred to herein as an "improper subset."

However, as will become apparent in later examples, in some implementations, one or more of the subsets of graphical indicators may be proper subsets of the corresponding set(s) of graphical indicators. To be clear, a GUI implemented using the concepts discussed herein may be configured to have subsets of graphical indicators that are all proper subsets of their respective sets of graphical indicators, subsets of graphical indicators that are all improper subsets of their respective sets of graphical indicators, or subsets of graphical indicators that are a mix of proper subsets and improper subsets of their respective sets of graphical indicators.

As can be seen, the graphical indicators 402*a* are each associated with a different first parameter of a potential offer. In this case, the first parameters associated with the graphical indicators 402*a* are amounts of social gaming credits. There are twelve different graphical indicators 402*a* shown, with each representing a different amount of social gaming credits. Similarly, the graphical indicators 402*b* are each associated with a different second parameter of the potential offer. In this case, the second parameters associated with the graphical indicators 402*b* are amounts of real currency. There are eight different graphical indicators 402*b* shown, with each representing a different amount of real currency.

It will be understood that while the graphical indicators 402*a* are all different from one another and the graphical indicators 402*b* are all different from one another, in other implementations, one or more of the graphical indicators in a given set or sets of graphical indicators may be present in multiple instances. Thus, the graphical indicators for a given set of graphical indicators may all represent different values of a given parameter (and may all appear different). Alternatively, the graphical indicators for a given set of graphical indicators may have at least some graphical indicators that represent different values of a given parameter (and may thus appear different from one another), but may also have some graphical indicators that appear multiple times within the given set and may represent the same parameter values.

With respect to the GUI 400, a request offer control 410 may be provided that, when selected, may cause a selection of a graphical indicator 402 from each subset 406 of graphical indicators to be made. The GUI 400 may then, after such selection has been made, be caused to indicate which of the graphical indicators 402 in each subset 406 of graphical indicators 402 has been selected, as shown in FIG. 4B. The indication of which graphical indicators 402 have been selected may be provided through any suitable mechanism, e.g., by highlighting the selected graphical indicator(s) 402 with a glowing outline, animated frame, or other encircling graphic, by superimposing a special graphic, e.g., a star, pointer, circle, etc., on the selected graphical indicator (s) 402, and so forth. Any method by which the selected graphical indicator in a given subset can be made visually distinct from the other graphical indicators in that subset may be used.

As shown in FIG. 4B, the "5 M" graphical indicator 402*a* was the graphical indicator 402*a* that was selected from the subset 406*a* of graphical indicators 402*a*, as indicated by the flash-outline selection indicator 408*a* surrounding that graphical indicator 402*a*. Similarly, the "10" graphical indicator 402*b* was the graphical indicator 402*b* that was selected from the subset 406*b* of graphical indicators 402*b*, as indicated by the triangular selection indicator 408*b* pointing towards the "10" graphical indicator 402*b*.

Thus, the GUI 400 conveys to the user an offer composed of two parameters: an amount of social gaming credits (5,000,000 social gaming credits) and an amount of real currency ($10). The offer, as indicated by the "Get . . . " and "For . . . " text, is for 5,000,000 social gaming credits for $10. The user, however, is able to easily see that the offers that could have been made could have ranged as low as 1000 credits for $20 or as high as 10,000,000 credits for $0.01. The user would, in this case, see that the amount of credits offered (5,000,000) is nearly the maximum that could have been offered (10,000,000), and may decide that despite the amount of real currency required for the offer also being nearly the maximum, the offer is nonetheless a relatively good bargain. The user may thus be more inclined to accept the offer than if presented with only the offer without the further context of what other offers might have been made.

The GUI 400 has also, in FIG. 4B, been caused to have a first set of controls 412 added to it that include a first control 414 and a second control 416. The first set of controls 412 may be configured to generate first user input information indicating whether or not a user accepts a parameter set represented by the selected graphical indicators 402. For example, the first control 414 may be a button or other user interface element that, when selected by a user, generates first user input information indicating that the user has accepted the offer based on the selected parameter set. Similarly, the second control 416 may be a button or other user interface element that, when selected by the user, generates first user input information that indicates that the user does not accept the offer based on the selected parameter set. When first user input information is received that indicates that the user has opted to accept the offer based on the selected parameter set, the system may then take additional steps to perform one or more operations that are based on the parameters indicated by the selected graphical indicators 402. For example, the system may reference credit card account information associated with the user, e.g., that has been entered by the user when setting up a social gaming account, and send a communication to the credit card company that administers that credit card account in order to initiate a charge transaction for the amount indicated by one of the parameters of the offer ($10, in this example). The system may then, after confirming that the charge was accepted, cause the indicated amount of social gaming currency to be credited to the user's social gaming account. Alternatively, if the offer involves the user providing some other form of compensation as part of the offer, the system may initiate other operations, e.g., debiting an account balance managed by the social gaming system—for example, if the offer is that the user may obtain a particular skin or avatar in exchange for a specified amount of social gaming currency, then the system may simply debit the indicated amount of social gaming currency from a social gaming currency account that is associated with the user and managed by the social gaming administration system and then associate the offered item(s), e.g., skins or avatars, with the user's social gaming account.

The clarity and intuitiveness of the GUI 400 in terms of conveying both the parameters of the offer being made and the parameters of other offers that could have been made is perhaps best illustrated by comparing it to an alternative GUI arrangement that conveys the same amount of information. For example, FIG. 5 depicts an example GUI 500 that lists, in table form, all of the potential offers 520 that the system could have made to the user. A single offer of the potential offers is shown as a selected offer 522 by the use of shading in the table cell containing that offer. A first set of controls 512 with a first control 514 and a second control 516 is also displayed. The first control 514 may, when selected by a user, indicate that the selected offer is accepted by the user, while the second control 516, when selected by the user, may indicate that the selected offer is rejected by the user. The GUI 500, while conveying exactly the same amount of information as the GUI 400, is much more difficult for a user to easily parse and makes it difficult for the user to easily understand the relative value of the selected parameters as compared to the other potential combinations of parameters that could have been selected. Moreover, since the number of parameter combinations that are offered is quite large (96 different parameter combinations), the font size used in the GUI 500 must necessarily be selected to be quite small in order to be able to simultaneously communicate all of the parameter combinations at once to a user (the GUIs 500 and 400 are shown as the same size GUI for easy comparison). For example, whereas the parameters in the GUI 400 are able to be shown at a font size that is at around 6% or 7% of the height of the GUI 400, the offers 520 in the GUI 500 are at a font size that is around 2% of the height of the GUI 500. Moreover, the GUI 500 is extremely dense, with little vertical and horizontal separation between the offers 520 (about 2% of the GUI height vertical separation in the GUI 500) as compared with the vertical and horizontal separation between the parameters in the GUI 400 (about 12% of the GUI height vertical separation in the GUI 400).

It will be understood that GUIs such as the GUI 500 may be particularly ill-suited for use on mobile devices, e.g., on smartphones—a typical smartphone may have a display that is on the order of 2.7" in width and 5.6" in height; in landscape format (such as may be used for a GUI such as the GUI 500) on such a display, the offers of the GUI 500 would be provided via text that was less than $1/16^{th}$ of an inch in height, which would be unreadable for most users. In contrast, the parameter information associated with the GUI 400 would be provided via text that was slightly less than $3/16^{th}$ of an inch in height, which is very readable on a smartphone display.

Additionally, the GUI 400 allows for a staged presentation of the selections of the graphical indicators 402. For example, the GUI may be configured to, when presenting the selections of the graphical indicators 402*a* and 402*b*, display an animation in which the GUI 400 is caused to highlight a different single graphical indicator 402*a* during each of a succession of increasingly longer time intervals. The graphical indicators 402*a* that are highlighted may be randomly selected or, in some cases, selected in sequence (e.g., in order from smallest associated parameter to largest associated parameter and then back to the smallest associated parameter). After a certain number of time intervals, the highlighted graphical indicator 402*a* may be retained as the selected graphical indicator 402*a* and the highlighting of different graphical indicators 402*a* may cease. After the selected graphical indicator 402*a* is indicated by the GUI 400, the system may then cause the GUI 400 to engage in a separate animation in which the selection indicator 408*b* is shown traveling around the circular outer perimeter of the second subset 406*b* of the graphical indicators 402*b* until it slowly comes to a stop such that the selection indicator 408*b* indicates the selected graphical indicator 408*b* (or, in another implementation, the selection indicator 408*b* may be kept stationary while the graphical indicators 402*b* are caused to rotate as a group about the center of the group, or both the group of the graphical indicators 402*b* and the selection indicator 408*b* are caused to rotate relative to one another, until the rotation is caused to slow down and stop such that the selected graphical indicator 402*b* is indicated by the selection indicator 408*b*). By performing the two selection animations sequentially, or at least having such animations conclude sequentially, such a GUI may introduce an element of suspense for the user since there will be a period of time in which only one or some of the parameters of the offer are known to the player and the full nature of the offer will only be known as the other graphical indicator(s) for the additional parameter or parameters is or are selected. The GUI 500 of FIG. 5, however, cannot offer such a piecemeal presentation of the parameters of the offer since each potential offer is presented as a single, self-contained display element.

When comparing the GUIs of FIGS. 5 and 4A/B, it is readily apparent that the GUI 400 presents offer parameter information, for both the offer made and the other offers that could have been made, in a manner that is clear to the user, easy to read, and which makes effective use of available screen space as compared with alternative approaches for conveying the same information, e.g., as shown in the GUI 500.

As noted earlier, the GUIs discussed herein allow for the presentation of the parameters of an offer while simultaneously presenting, in a space-efficient and easily interpreted fashion, the parameters of multiple other offers that could have been presented but were not. This allows the user to rapidly evaluate how the proffered offer is compared to what could have been proffered and may make the user more likely to accept the offer in situations in which the user sees that the offer is, in fact, more favorable than unfavorable compared to the other offers.

In the example of FIGS. 4A and 4B, the first subset 406*a* of graphical indicators 402*a* was an improper subset of the first set 404*a* of graphical indicators 402*a* and the second subset 406*b* of graphical indicators 402*b* was an improper subset of the second set 404*b* of graphical indicators 402*b*. However, as noted above, this may not always be the case.

Figure 6A:
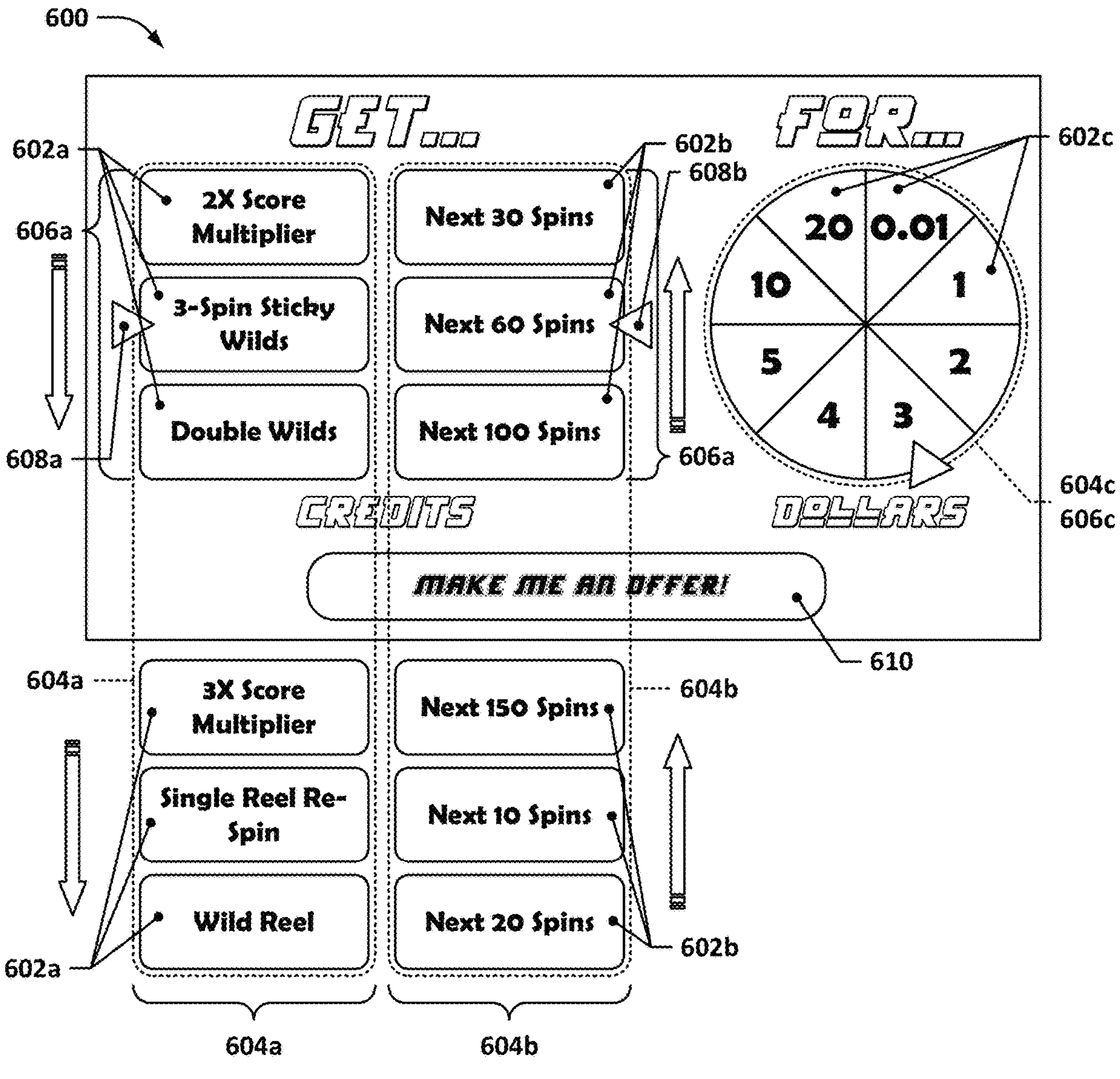
FIGS. 6A and 6B depict another example GUI for providing an overview of an offer and potential offers that could have been made.
Figure 6B:
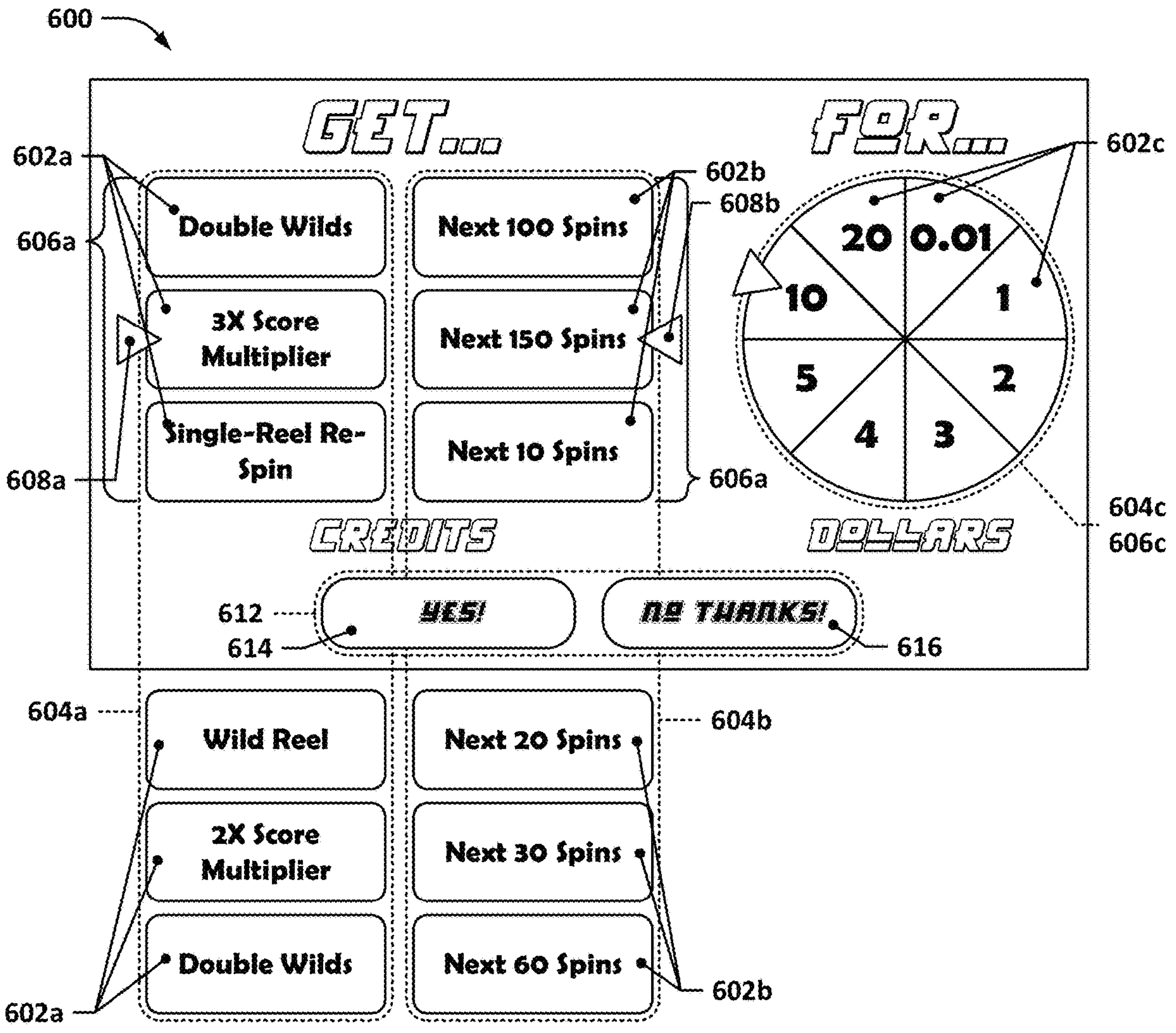

FIGS. 6A and 6B depict an example GUI for providing users with offer information in which at least one of the subsets of graphical indicators is a proper subset of the corresponding set of graphical indicators. As seen in FIGS. 6A and 6B, a GUI 600 is provided that includes three displayed subsets of graphical indicators 602—a first subset 606*a*, a second subset 606*b*, and a third subset 606*c*. The first subset 606*a* of graphical indicators 602*a* includes a plurality of graphical indicators 602*a* that are drawn from a first set 604*a* of graphical indicators 602*a* and the second subset 606*b* of graphical indicators 602*b* includes a plurality of graphical indicators 602*b* that are drawn from a second set 604*b* of graphical indicators 602*b*. The first set 604*a* of graphical indicators 602*a* includes, in this example, a total of six graphical indicators 602*a* while the first subset 606*a* of graphical indicators 602*a* includes only three of those six graphical indicators 602*a*. Similarly, the second set 604*b* of graphical indicators 602*b* also includes, in this example, a total of six graphical indicators 602*b* while the second subset 606*b* of graphical indicators 602*b* includes only three of those six graphical indicators 602*b*. It will be understood that the three graphical indicators 602*a* and the three graphical indicators 602*b* that are located below the GUI 600 in FIGS. 6A and 6B represent graphical indicators that are in the first set 604*a* and the second set 604*b* of graphical indicators but that are not in the corresponding first subset 606*a* of graphical indicators 602*a* and second subset 606*b* of graphical indicators 602*b* and therefore are not displayed in GUI 600 in this particular example.

The third subset 606*c* of graphical indicators 602*c*, in contrast, is a proper subset of a third set 604*c* of graphical indicators 602*c*. It should be understood, of course, that each subset 606 of graphical indicators 602 may be either a proper or improper subset of the corresponding set 604 of graphical indicators 602. Thus, all of the subsets 606, none of the subsets 606, or only some of the subsets 606 of graphical indicators 602 may be proper subsets of their corresponding sets 604 of graphical indicators 602.

FIG. 6A depicts the GUI 600 prior to selection of such graphical indicators, while FIG. 6B depicts the GUI 600 after selection of one graphical indicator 602 from each subset 606 of graphical indicators 602.

Approaches in which one or more of the subsets 606 are proper subsets of their corresponding sets of graphical indicators may provide somewhat less information to a user as to the range of potential offers that could have been provided, but may still, nonetheless, provide some insight as to the relative value of an offer that is based on a selected set of parameters, as indicated by which graphical indicators 602 are indicated as having been selected.

Another difference in the GUI 600 of FIGS. 6A and 6B and the GUI 400 of FIGS. 4A and 4B is that there are three sets 604 of graphical indicators 602 instead of just two—it will be understood that while such GUIs would present, at a minimum, at least two subsets 606 of graphical indicators 602, such GUI implementations may include, as in this example, three subsets 606 of graphical indicators 602, or even four, five, six, or more subsets of graphical indicators 602. However, two or three subsets 606 of graphical indicators 602, as shown in the GUIs 400 and 600, may prove to be the most intuitive and easy for users to comprehend and readily understand in a meaningful way.

In this example, the first set 604*a* of graphical indicators 602*a* includes graphical indicators 602*a* that each represent a game enhancement feature, e.g., an enhancement to game play that may provide a user with an advantage when playing one or more social games. For example, two of the graphical indicators 602*a* are for score multipliers, e.g., 2× and 3× score multipliers. Another graphical indicator 602*a* that is shown is a 3-spin sticky wilds enhancement that may, while active, cause any “wild” symbols that may be landed in a symbol position on a spin of the reels of a slot machine game to remain “stuck” in that symbol position for the next two spins. Another graphical indicator 602*a* that is shown is a “wild reel” enhancement that, while active, may cause one of the reels in a reel-type slot machine to turn into a “wild reel” in which all of the symbols on the reel are “wild” symbols. Yet another graphical indicator 602*a* that is shown is a “double wilds” enhancement that may, for example, double the number of wild symbols that may be present in a reel set for a slot machine game, thereby effectively doubling the chances of obtaining a wild symbol during play of the slot machine game. The final enhancement that is represented by the graphical indicators 602*a* is a “single reel re-spin” enhancement that allows a player to, once per slot machine play, re-spin any single reel in order to try and obtain a higher-scoring outcome. Thus, the parameters represented by each graphical indicator 602*a* are parameters that each define a particular type of game enhancement.

The second set 604*b* of graphical indicators 602*b* includes graphical indicators 602*b* that are each associated with a parameter reflecting a different duration. In this case, the duration is not time-based, but spin-based, and defines the period of time during which the game enhancement of the first set 604*a* of graphical indicators 602*a* will be active (if the offer being made is accepted by the user). Such durations may, of course, also be time-based, e.g., 1 minute, 2 minutes, 3 minutes, 5 minutes, 10 minutes, etc., or a mix of spin-based (or play-based) and time-based durations.

In some systems that display a GUI 600 in which at least one proper subset 606 of graphical indicators 602 is shown, each of the graphical indicators 602 in the corresponding set of graphical indicators 602 (or at least some additional graphical indicators 602 beyond what can be shown at one time in such a subset 606 of graphical indicators 602) may be shown during an animation that is played in association with the indication of which graphical indicators 602 are being selected. For example, the graphical indicators 602*a* that are in the first set 604*a* of graphical indicators 602*a* may be scrolled through the three positions where the graphical indicators 602*a* in the GUI 600 are displayed so that it appears that the graphical indicators 602*a* in the first set 604*a* of graphical indicators 602*a*, for example, are located on a reel that is spinning past three windows that each allow a different graphical indicator 602*a* on the “reel” to be seen (indicated in FIG. 6A by the “down” arrows indicating that the graphical indicators 602*a* appear to be traveling downward during such an animation). A similar animation may be provided for the graphical indicators 602*b* in the second set 604*b* of graphical indicators 602*b* (indicated in FIG. 6A by the “up” arrows indicating that the graphical indicators 602*b* appear to be traveling upward during such an animation). The selection indicators 608*a* and 608*b* may be provided next to, for example, the middle positions that such graphical indicators 602 may pass through during such animation. When the scrolling animation is then caused to stop, the graphical indicators 602 that are located at the locations indicated by the selection indicators 608*a* and 608*b* may be considered to be the selected graphical indicators 602 from the first set 604*a* of graphical indicators 602*a* and the second set 604*b* of graphical indicators 602*b*. Such animations may help offset the potentially smaller amount of information regarding the universe of offers from which the selected offer is drawn that may be the consequence of using one or more subsets 606 that are proper subsets of the corresponding set(s) 604 of graphical indicators 602.

The third subset 606*c* of graphical indicators 602*c* and the third set 604*c* of graphical indicators 602*c* are, in this example, identical to the second subset 406*b* of graphical indicators 402*b* and the second set 404*b* of graphical indicators 402*b* discussed above with respect to the GUI 400. Additionally, the GUI 600 may also include a set of controls 612 that may include a first control 614 and a second control 616; the set of controls 612 may operate in a similar manner to the set of controls 412 discussed earlier with respect to generating first user input information that may be evaluated by the system in order to determine if an offer has been accepted. The set of controls 612 may, for example, be replaced with a request offer control 610 prior to initiating selection of the graphical indicators 602.

The selection of graphical indicators to form a set of parameters defining an offer may be performed in at least two ways. In some implementations, all selections of graphical indicators for a given GUI may be based on a random selection, e.g., according to an outcome from a random number generator. However, the random selection of a graphical indicator from a given set of graphical indicators may be managed such that the selected graphical indicator from each set of graphical indicators is also within the corresponding subset of graphical indicators for that set of graphical indicators. For example, in an implementation in which a subset of graphical indicators is a proper subset of graphical indicators of the corresponding set of graphical indicators, a graphical indicator from the set of graphical indicators may be randomly selected to be the selected graphical indicator and then additional graphical indicators from the set of graphical indicators may be further selected, e.g., randomly or based on a non-random rule, to populate the corresponding subset of graphical indicators. For example, in implementations in which the graphical indicators from a set of graphical indicators are shown as a proper subset of graphical indicators that changes over successive time periods during an animation, e.g., similar to how slot machine symbols may scroll past windows in a slot machine display, the graphical indicators that are selected to be included in the subset of graphical indicators may be the selected graphical indicator plus one or more graphical indicators that are sequentially adjacent to the selected graphical indicator in, for example, a predefined order of graphical indicators for the set of graphical indicators. In an alternate such implementation, the subset of graphical indicators may first be randomly selected from the corresponding set of graphical indicators and the selected graphical indicator then randomly selected from the subset of graphical indicators. This may be more appropriate for situations in which the user may be presented with the subset of graphical indicators in a more or less static presentation, e.g., as shown for the set 404*a* of graphical indicators 402*a*. Such options are, for the purposes of this disclosure, both considered to be random selections of a graphical indicator from a set of graphical indicators.

It will also be understood that such random selections may, in some instances, be weighted random selections. For example, in some implementations, different graphical indicators in a given set of graphical indicators may have different random selection weights that may cause some graphical indicators to be randomly selected more often than others. In other implementations, a set of graphical indicators may feature multiple instances of the same graphical indicator or graphical indicators but each instance of a graphical indicator may have the same chance of being randomly selected. Such implementations may, in effect, provide a similar effect to a weighted random selection, as the graphical indicators for which there are more instances in the set of graphical indicators may be randomly selected more often than those graphical indicators for which there are fewer instances.

In other implementations, at least one selection of a graphical indicator from one of the sets of graphical indicators may be made randomly and at least one selection of a graphical indicator from the other or one of the other sets of graphical indicators may be made according to receipt of a user selection. For example, such a GUI may be set up to present a first subset of graphical indicators, each of which may be a user-selectable control. The user may then be invited to select one of the graphical indicators in the first subset of graphical indicators; the user-selected graphical indicator may then be used by the system as the selected graphical indicator that provides a first parameter of the offer that will be made. After the user has selected one of the graphical indicators, the system may then cause a random selection to be made from the other or one of the other sets of graphical indicators. If there are more than two sets of graphical indicators that the GUI is configured to display subsets from, then there may, in some such instances, be variants in which a random selection of a graphical indicator is made from a first subset of graphical indicators, followed by a user-directed selection of a graphical indicator from a second subset of graphical indicators, followed by a second random selection of a graphical indicator from a third subset of graphical indicators. Generally speaking, it may be desirable to have at least the last selection of a graphical indicator that is made in such a GUI be a random selection.

Figure 7A:
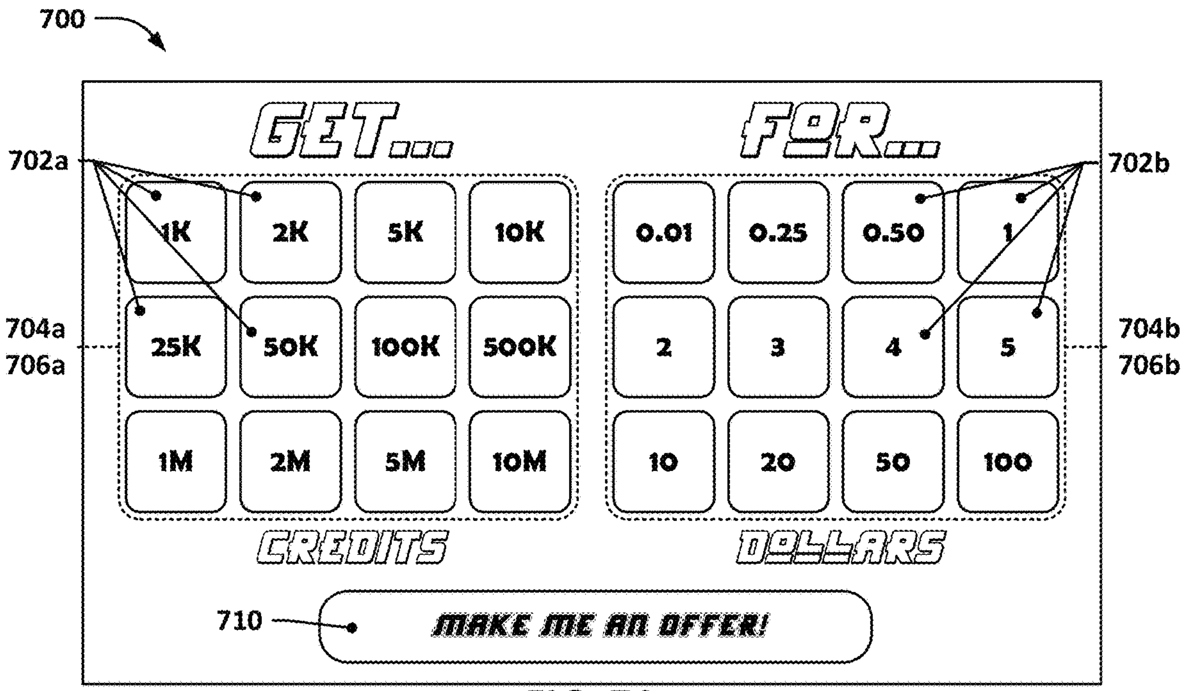
FIGS. 7A through 7C depict another example GUI for providing an overview of an offer and potential offers that could have been made.
Figure 7B:
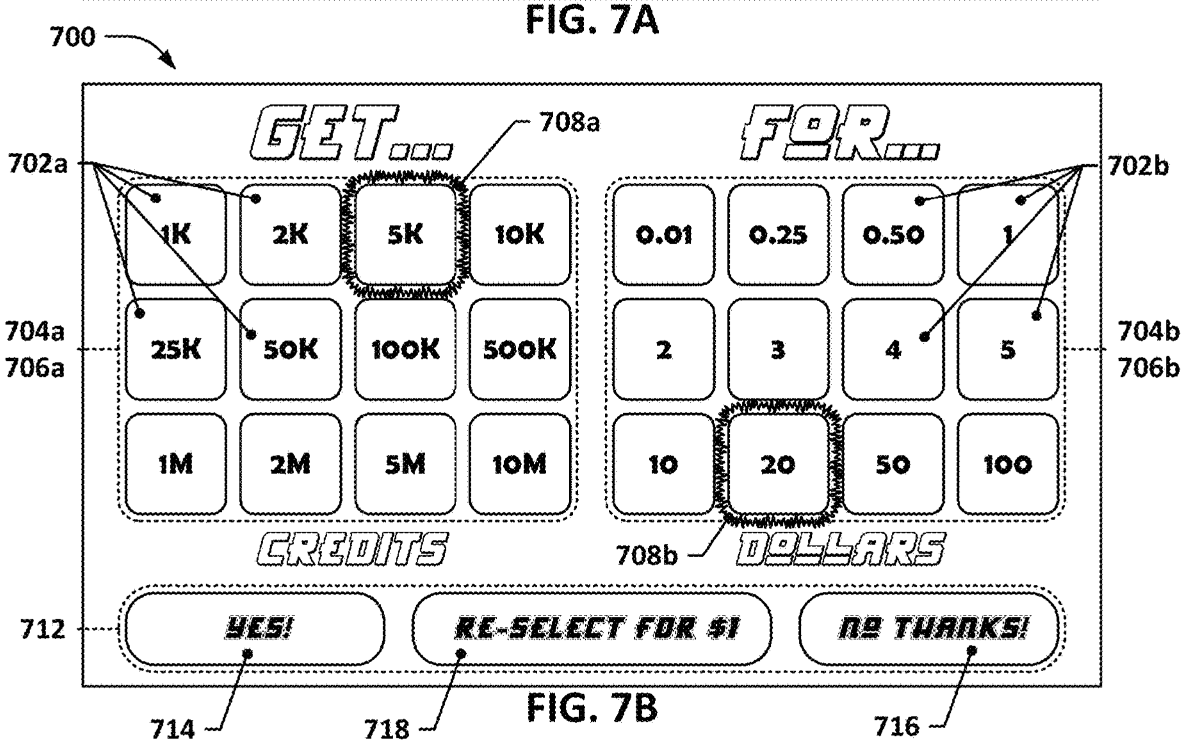
Figure 7C:
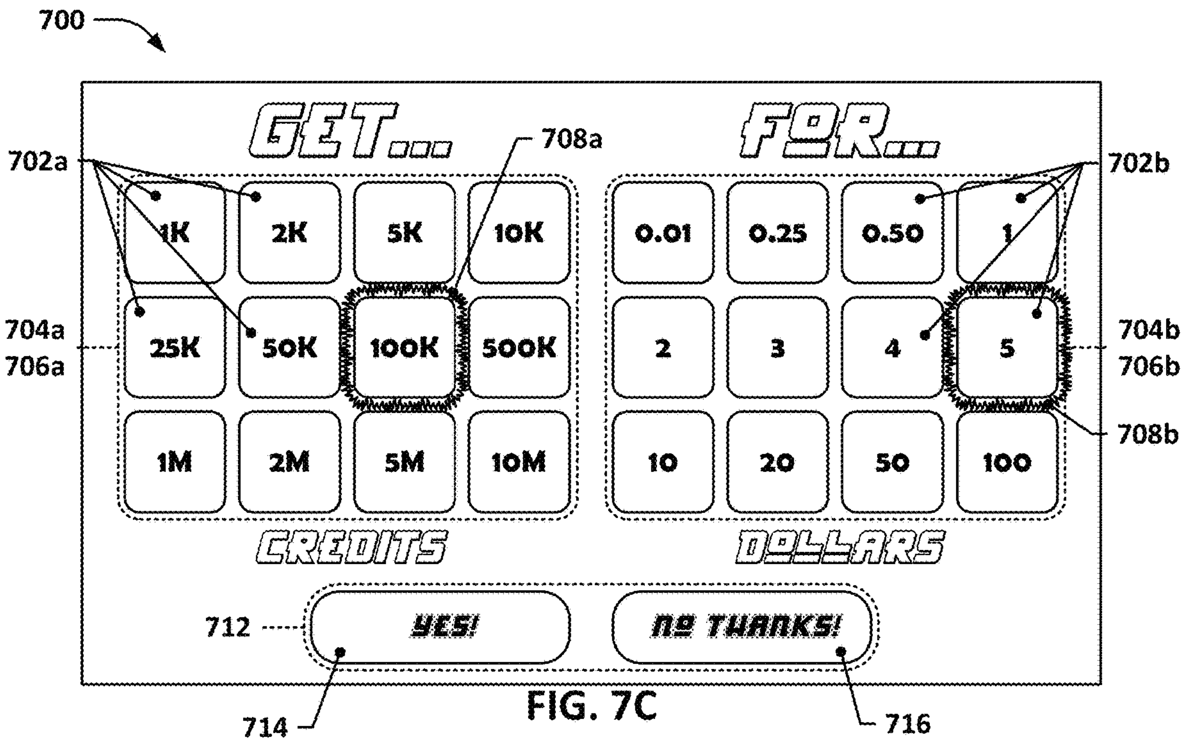

In some implementations, GUIs such as are described herein may be configured to offer two mechanisms by which a user can reject an offer provided by the GUI. FIGS. 7A through 7C depict an example GUI that allows a user to reject an offer provided by the GUI outright or to reject the offer provided by the GUI and request a new offer.

As shown in FIG. 7A, the GUI 700 includes a first set 704*a* of graphical indicators 702*a* and a second set 704*b* or graphical indicators 702*b*. In this example, the subsets of graphical indicators 702 that are drawn from the sets 704 of graphical indicators are improper subsets 706 of those sets 704. Thus, the first subset 706*a* and the first set 704*a* are identical, and the second subset 706*b* and the second set 704*b* are identical.

The graphical indicators 702*a* each indicate a parameter representing a different quantity of a social currency, while the graphical indicators 702*b* each indicate a parameter representing a different quantity of real currency. A request offer control 710 is provided on the GUI 700 as well. When the request offer control 710 is selected, the GUI 700 may transition to a state such as is shown in FIG. 7B, for example.

The GUI 700 in FIG. 7B has been updated to reflect the selection of one of the graphical indicators 702*a* and one of the graphical indicators 702*b*, e.g., through random selection. The selected graphical indicators 702*a* and 702*b* are indicated by selection indicators 708*a* and 708*b*, respectively. In the depicted example, the parameter associated with the selected graphical indicator 702*a* is 5000 social currency credits and the parameter associated with the selected graphical indicator 702*b* is $20 real currency. Thus, the parameter set represented by the selected graphical indicators 702*a* and 702*b* defines an offer to the user of 5000 social gaming credits for $20 real currency.

The GUI 700 of FIG. 7B has also been updated with a set of controls 712 that may include a first control 714, a second control 716, and a third control 718. The set of controls 712 may, responsive to a user's selection of one of the first control 714, the second control 716, or the third control 718, generate first user input information that indicates whether or not the user has accepted or rejected the offer.

For example, the first control 714, when selected by a user, may cause first user input information to be generated that indicates the user's acceptance of the offer, responsive to which the system may perform one or more operations to cause the transaction or transactions represented by the offer to be implemented, as discussed earlier. The second control 716, when selected by a user, may cause first user input information to be generated that indicates the user's rejection of the offer, with no desire on the part of the user to engage in any further interaction with the GUI 700 regarding the offer. The first control 714 and the second control 716, it will be recognized, may function in a similar manner to the first controls and second controls discussed earlier herein.

The third control 718, however, may generate a different type of first user input information that indicates that the user does not wish to accept the offer but wishes to instead initiate a re-selection of the graphical indicators. Such a feature may be offered in a variety of formats. In some implementations, for example, the GUI 700 may provide the user with the ability to re-select the graphical indicators 702 for free. In other implementations, as depicted in FIG. 7B, the user may be provided with the ability to cause the graphical indicators 702 to be re-selected in exchange for payment, e.g., either with real currency (as shown in FIG. 7B) or in exchange for some other form of compensation, e.g., an amount of social gaming credits debited from the user's social gaming account. Either such graphical indicator re-selection feature may, regardless of whether provided for free or in return for compensation, may be provided for a limited number of times per session. For example, the user may be provided with the ability to cause the graphical indicators 702 to be re-selected up to three times per session. In other such implementations, the user may only be provided with one opportunity to do so per offer session. In some implementations, the two types of graphical indicator re-selection features may be offered in tandem, e.g., the user may be provided with a first opportunity to cause the graphical indicators 702 to be reselected for free, followed by a second opportunity to cause the graphical indicators 702 to be reselected for compensation. In some implementations in which multiple opportunities for reselection of the graphical indicators 702 for compensation are provided, the amount of compensation required from the user in order to avail themselves of successive such opportunities may be increased from opportunity to opportunity, thus becoming more and more expensive.

FIG. 7C depicts the GUI 700 after a user has selected the third control 718, thereby providing first user input information indicating that the user declines the offer but wishes to initiate re-selection of the selected graphical indicators. In this case, the system has caused a transaction to be initiated, e.g., with a credit card account associated with the user, to charge the indicated amount, e.g., $1, in response to selection of the third control 718 and has randomly performed a new selection of one of the graphical indicators 702*a* and one of the graphical indicators 702*b*. The set of controls 712 has been updated to remove the third control 718, thereby indicating that the user has no further opportunities to cause re-selection of the graphical indicators—the third control 718, however, may be left in place if further such opportunities are available (and updated, if appropriate, to reflect a change in the amount of compensation required to initiate a further re-selection of the graphical indicators).

It will be apparent from the examples discussed above and from the Figures that the graphical indicators used to convey parameter information regarding the offer made and the offers that could have been made may be arranged in a variety of ways. In some implementations, for example, the graphical indicators of a displayed subset of graphical indicators of a set of graphical indicators may be arranged in a grid format, e.g., in a linear or rectangular array or along one or more axes that are parallel to one another. In some implementations, the graphical indicators of a displayed subset of graphical indicators of a set of graphical indicators may be arranged in a circular array or arrangement, e.g., as sector segments of a segmented wheel or ring (such segments need not be all the same size/sweep angle—for example, if different graphical indicators are to have different weightings of being randomly selected, the graphical indicators that are to be more frequently selected during such random selection may be sized to have larger sweep angles than those graphical indicators that are to have lower chances of selection). And, as is made clear in the examples above, a given GUI according to the concepts discussed herein may display the graphical indicators for different subsets in different manners, e.g., the graphical indicators for one subset may be displayed in a rectangular array, while the graphical indicators for another subset in the same GUI may be displayed as segments of a wheel.

In the examples discussed herein, the graphical indicators for a given subset of graphical indicators have generally been shown arranged such that they are ordered with respect to the parameter that each represents, e.g., the graphical indicators 402*b* from the GUI 400 are shown as representing parameter values that increase as one progresses clockwise around the circular array of graphical indicators 402*b* from top-dead-center and the graphical indicators 402*a* from the GUI 400 are shown as representing parameter values that increase from left to right, and then from top to bottom, as one traverses the rectangular array of graphical indicators 402*a*. Such an arrangement may provide users with the ability to rapidly understand the full range of parameters that is available for each subset of parameters, thereby allowing for more rapid comprehension by the player of where the offer being made stands with respect to the universe of offers that could have been made. However, some implementations may forego such conventions and may instead arrange the graphical indicators for one or more subsets of graphical indicators according to other rules, e.g., randomly.

It will also be understood that the presentation of a "request offer" control or the like need not be part of the GUIs discussed herein. For example, selection of the parameters of an offer may begin automatically with presentation of the GUIs discussed here, or may be triggered by other events.

Figure 8:
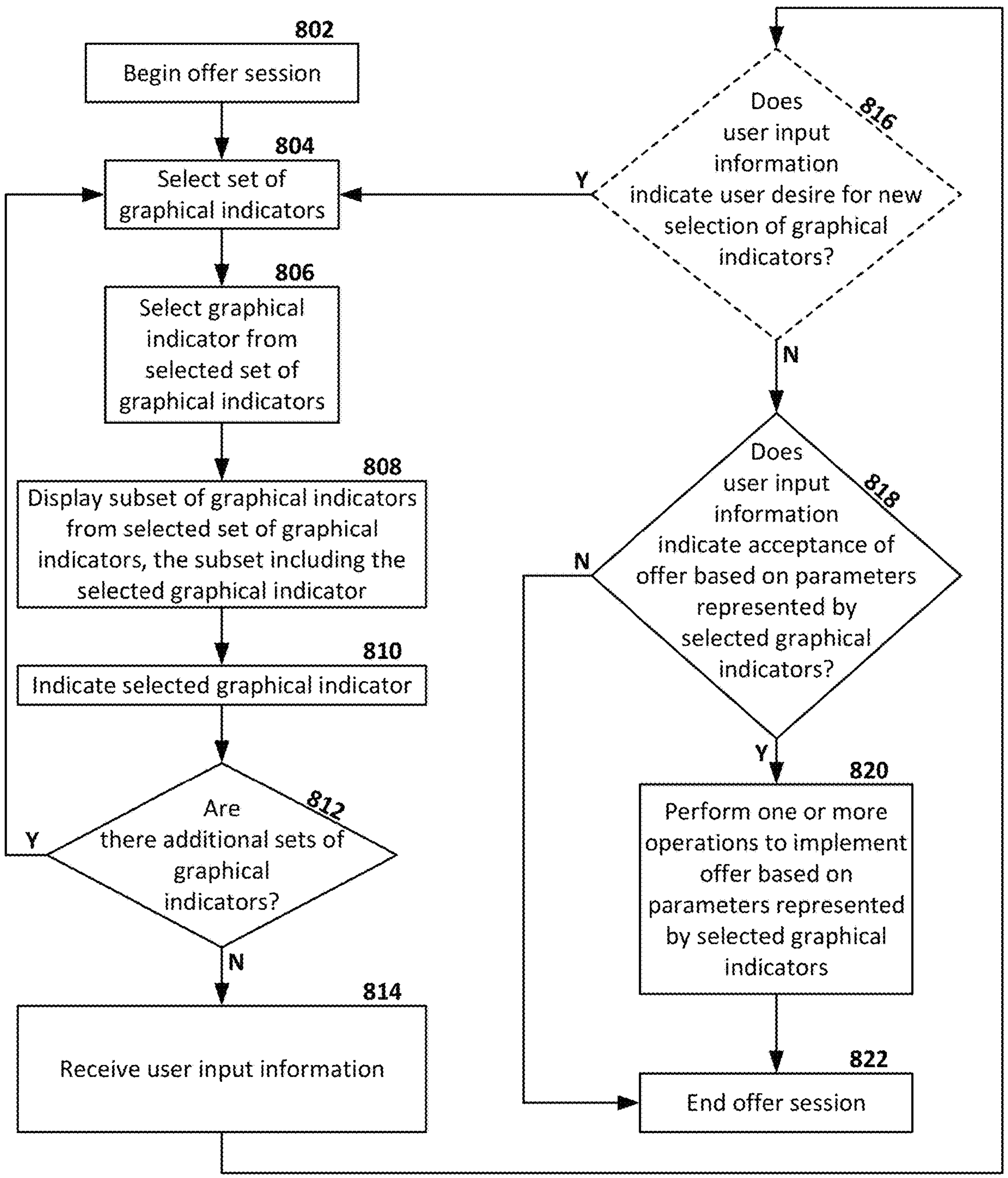
FIG. 8 depicts a flow chart of an example technique for providing a GUI as described herein.

FIG. 8 depicts a flow diagram of a technique that may be used to implement a GUI according to the concepts outlined herein. The technique may begin in block 802 in which an offer session, i.e., a presentation of an offer via the GUI, may begin. In block 804, a set of graphical indicators may be selected from multiple sets of graphical indicators that are associated with the GUI in question. Each graphical indicator in each set of graphical indicators may represent a value of a parameter associated with a potential offer.

In block 806, a graphical indicator may be selected from the selected set of graphical indicators. As discussed earlier, the selected graphical indicator is also in a corresponding subset of the set of graphical indicators. The corresponding subset may, depending on the particular implementation, be selected prior to selection of the selected graphical indicator or after selection of the selected graphical indicator. For example, a particular graphical indicator may be selected from a set of graphical indicators and then other graphical indicators may be selected from the same set of graphical indicators to produce the subset of graphical indicators. Alternatively, the subset of graphical indicators may be selected from the set of graphical indicators and the selected graphical indicator then selected from the subset of graphical indicators. Regardless, the selected graphical indicator will ultimately be in both the selected set of graphical indicators and a subset thereof. As made clear earlier, in some implementations, the subset of graphical indicators may be identical to the set of which it is a subset of. As indicated earlier herein, such selection may be random, according to one or more rules, or, in some cases, the result of a user selection.

In block 808, the subset of graphical indicators—including the selected graphical indicator—may be caused to be displayed on one or more displays. In block 810, the selected graphical indicator may be indicated, e.g., through highlighting or otherwise graphically differentiating it from the other graphical symbols in the subset of graphical symbols.

In block 812, a determination may be made as to whether there is an additional set or sets of graphical indicators associated with the GUI from which a graphical indicator must still be selected. If so, the technique may return to block 804 and the process may repeat. If not, the technique may proceed to block 814, in which user input information may be received. The user input information may indicate whether a user accepts the offer that is based on the parameters represented by the selected graphical indicators, as discussed earlier herein.

After the user input information has been received, the technique may optionally proceed to block 816, in which a determination may be made as to whether the user input information indicates that the user desires to have the selected graphical indicators re-selected. As noted earlier, such a feature may be present in some GUIs but not others; if the GUI in question does not include such a feature, then the technique may instead proceed directly to block 818. If such a feature is provided by the GUI, however, and the user input information indicates that the user desires to initiate re-selection of the selected graphical indicators, the technique may return to block 804 and the graphical indicator selection process may be performed again for at least one of the sets of graphical indicators.

If such a feature does not exist in the GUI, or the user input information indicates that the user does not wish to initiate re-selection of the selected graphical indicators, the technique may proceed to block 818. In block 818, the user input information may be evaluated to determine if the user accepts the offer that is based on the parameters represented by the selected graphical indicators. If not, the technique may proceed to block 822, in which the offer session may be concluded without any offer transaction occurring. If so, the technique may proceed to block 820, in which one or more operations may be performed to implement the offer that is based on the parameters represented by the selected graphical indicators. For example, the system providing the GUI, or one that is in communication therewith, may cause an account associated with the user to be debited by an amount represented by a parameter represented by one of the selected graphical indicators and another account associated with the user to be credited by an amount represented by another parameter represented by the other or one of the other selected graphical indicators.

It will be understood that the technique of FIG. 8 is merely an example technique, and that other implementations may implement the GUIs discussed herein according to other techniques but with similar effect to what is described herein. Such alternative implementations are also considered to be within the scope of this disclosure.

It will be understood that the various GUIs discussed herein may be implemented entirely locally, e.g., by a processor or processors of a single device, such as a smartphone, or may be provided using processors located in different devices or systems. For example, a remote server may be configured to manage the sets of graphical indicators used in GUIs such as are described herein, including selecting graphical subsets of graphical indicators and selecting a selected graphical indicator from each subset of graphical indicators. Information regarding the sets of graphical indicators, subsets of graphical indicators, and selected graphical indicators may then be transmitted, e.g., via a network connection (wired, wireless, or a mixture of both) to another device, e.g., a smartphone, the processor or processors of which may then implement the GUI using the information regarding the sets of graphical indicators, subsets of graphical indicators, and selected graphical indicators. Such information may be generated and/or sent in response to receipt of a request from such another device, e.g., a request from a smartphone for the server to provide such information. In other, similar implementations, the remote server may, for example, provide the graphical indicators to be used in implementing such a GUI but the device on which the GUI is actually displayed may, for example, select subsets of the graphical indicators from those sets of graphical indicators and then select selected graphical indicators from the subsets of graphical indicators. Such distributed-computing implementations of the GUI provisioning techniques discussed herein is to be understood to also be within the scope of this disclosure.

It will be appreciated that in such distributed computing arrangements, the computer-executable instructions for implementing the GUI may be distributed between different memory devices located in different devices, e.g., the computer-executable instructions for selecting sets of graphical indicators, subsets thereof, and selected graphical indicators from the subsets may be stored on one or more memory devices of a server, while computer-executable instructions for using information regarding such selections to provide a GUI may be stored on another device, e.g., a smartphone.

In recognition of the possibility of such distributed processing arrangements, the term "collectively," as used herein with reference to memory devices and/or processors or various other items, should be understood to indicate that the referenced collection of items has the characteristics or provides the functionalities that are associated with that collection. For example, if a server and a client device collectively store instructions for causing A, B, and C to occur, this encompasses at least the following scenarios:

a) The server stores instructions for causing A, B, and C to occur, but the client device stores no instructions that cause A, B, and C to occur.
b) The client device stores instructions for causing A, B, and C to occur, but the server stores no instructions that cause A, B, and C to occur.
c) The server stores instructions for causing a proper subset of A, B, and C to occur, e.g., A and B but not C, and the client device stores instructions that cause a different proper subset of A, B, and C to occur, e.g., C but not A and B, where instructions for causing each of A, B, and C to occur are respectively stored on either or both the client device and the server.

d) The server stores instructions for causing a subset of A, B, and C to occur, e.g., A and B but not C, and the client device stores instructions that cause a different subset of A, B, and C to occur, e.g., B and C but not A, where instructions for causing each of A, B, and C to occur are respectively stored on either or both the client device and the server.

e) The server stores instructions for causing A and a portion of B to occur, and the client device stores instructions that cause C and the remaining portion of B to occur.

In all of the above scenarios, between the server and the client device, there are, collectively, instructions that are stored for causing A, B, and C to occur, i.e., such instructions are stored on one or both devices and it will be recognized that using the term "collectively," e.g., the server and the client device, collectively, store instructions for causing A, B, and C to occur, encompasses all of the above scenarios as well as additional, similar scenarios.

Similarly, a collection of processors, e.g., a first set of one or more processors and a second set of one or more processors, may be caused, collectively, to, perform one or more actions, e.g., actions A, B, and C. As with the previous example, various permutations fall within the scope of such "collective" language:

a) The first set of one or more processors may be caused to perform each of A, B, and C, and the second set of one or more processors may not perform any of A, B, or C.

b) The second set of one or more processors may be caused to perform each of A, B, and C, and the first set of one or more processors may not perform any of A, B, or C.

c) The first set of one or more processors may be caused to perform a proper subset of A, B, and C, and the second set of one or more processors may be caused to perform a different proper subset of A, B, and C to be performed such that between the two sets of processors, all of A, B, and C are caused to be performed.

d) The first set of one or more processors may be caused to perform A and a portion of B, and the second set of one or more processors may be caused to perform C and the remainder of B.

It is to be understood that the phrases "for each <item> of the one or more <items>," "each <item> of the one or more <items>," or the like, if used herein, are inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items.

The term "between," as used herein and when used with a range of values, is to be understood, unless otherwise indicated, as being inclusive of the start and end values of that range. For example, between 1 and 5 is to be understood to be inclusive of the numbers 1, 2, 3, 4, and 5, not just the numbers 2, 3, and 4.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood. It is also to be understood that use of the ordinal indicator "first" herein, e.g., "a first item," should not be read as suggesting, implicitly or inherently, that there is necessarily a "second" instance, e.g., "a second item."

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A system comprising:

one or more display devices;

one or more processors; and one or more memories, wherein the one or more memories store computer-executable instructions for controlling the one or more processors to:

cause a plurality of subsets of graphical indicators to be displayed on the one or more display devices, wherein:

each subset of graphical indicators includes graphical indicators included in a corresponding set of graphical indicators, the plurality of subsets of graphical indicators includes at least a first subset of graphical indicators included in a first set of the graphical indicators and a second subset of graphical indicators included in a second set of the graphical indicators, the graphical indicators in the first subset of graphical indicators each represent a quantity of an item and are arranged in a sequential order based on the quantities they represent when displayed on the one or more display devices, each subset of graphical indicators includes a corresponding plurality of graphical indicators, and each graphical indicator represents a parameter;

select one graphical indicator from each set of graphical indicators, wherein the graphical indicator selected from each set of graphical indicators is also in the subset of graphical indicators in that set of graphical indicators;

cause the selected graphical indicator from each set of graphical indicators to be indicated on the one or more display devices as being selected;

receive first user input information indicating whether or not a user accepts a parameter set indicated by the selected graphical indicators; and perform, responsive to receipt of the first user input information indicating that the user accepted the parameter set indicated by the selected graphical indicators, one or more operations based on the parameters indicated by the selected graphical indicators.

2. The system of claim 1, wherein the one or more memories further store computer-executable instructions for further controlling the one or more processors to cause the graphical indicators in the first subset of graphical indicators to be positioned along a path such that the quantities represented by the graphical indicators in the first subset of graphical indicators are arranged in ascending or descending order.

3. The system of claim 1, wherein the graphical indicators in the first subset of graphical indicators are arranged in a two-dimensional array such that the graphical indicators in the first subset of graphical indicators are displayed in multiple rows and columns, with the graphical indicators displayed in each row representing quantities that increase in value with increasing distance from a first axis and with the graphical indicators displayed in each column representing quantities that increase in value with increasing distance from a second axis, wherein the columns are arranged along the first axis and the rows are arranged along the second axis.

4. The system of claim 3, wherein multiple graphical indicators in the first subset of graphical indicators are visible in their entireties in each row and each column of the two-dimensional array.

5. The system of claim 1, wherein the graphical indicators in the first subset of graphical indicators are arranged in a circular array with the quantities represented by the graphical indicators in the circular array increasing in a clockwise or counterclockwise manner.

6. The system of claim 1, wherein the first subset of graphical indicators includes all of the graphical indicators in the first set of graphical indicators.

7. The system of claim 6, wherein the second subset of graphical indicators includes all of the graphical indicators in the second set of graphical indicators.

8. One or more computer-readable media storing computer-executable instructions for controlling one or more processors to:

cause a plurality of subsets of graphical indicators to be displayed on one or more display devices, wherein:

each subset of graphical indicators includes graphical indicators included in a corresponding set of graphical indicators, the plurality of subsets of graphical indicators includes at least a first subset of graphical indicators included in a first set of the graphical indicators and a second subset of graphical indicators included in a second set of the graphical indicators, the graphical indicators in the first subset of graphical indicators each represent a quantity of an item and are arranged in a sequential order based on the quantities they represent when displayed on the one or more display devices, each subset of graphical indicators includes a corresponding plurality of graphical indicators, and each graphical indicator represents a parameter;

select one graphical indicator from each set of graphical indicators, wherein the graphical indicator selected from each set of graphical indicators is also in the subset of graphical indicators in that set of graphical indicators;

cause the selected graphical indicator from each set of graphical indicators to be indicated on the one or more display devices as being selected;

receive first user input information indicating whether or not a user accepts a parameter set indicated by the selected graphical indicators; and perform, responsive to receipt of the first user input information indicating that the user accepted the parameter set indicated by the selected graphical indicators, one or more operations based on the parameters indicated by the selected graphical indicators.

9. The one or more computer-readable media of claim 8, further storing additional computer-executable instructions for further controlling the one or more processors to cause the graphical indicators in the first subset of graphical indicators to be positioned along a path such that the quantities represented by the graphical indicators in the first subset of graphical indicators are arranged in ascending or descending order.

10. The one or more computer-readable media of claim 8, wherein the graphical indicators in the first subset of graphical indicators are arranged in a two-dimensional array such that the graphical indicators in the first subset of graphical indicators are displayed in multiple rows and columns, with the graphical indicators displayed in each row representing quantities that increase in value with increasing distance from a first axis and with the graphical indicators displayed in each column representing quantities that increase in value with increasing distance from a second axis, wherein the columns are arranged along the first axis and the rows are arranged along the second axis.

11. The one or more computer-readable media of claim 10, wherein multiple graphical indicators in the first subset of graphical indicators are visible in their entireties in each row and each column of the two-dimensional array.

12. The one or more computer-readable media of claim 8, wherein the graphical indicators in the first subset of graphical indicators are arranged in a circular array with the quantities represented by the graphical indicators in the circular array increasing in a clockwise or counterclockwise manner.

13. The one or more computer-readable media of claim 8, wherein the first subset of graphical indicators includes all of the graphical indicators in the first set of graphical indicators.

14. The one or more computer-readable media of claim 13, wherein the second subset of graphical indicators includes all of the graphical indicators in the second set of graphical indicators.

15. A method, executed by one or more processors, comprising:

causing, by the one or more processors, a plurality of subsets of graphical indicators to be displayed on one or more display devices, wherein:

each subset of graphical indicators includes graphical indicators included in a corresponding set of graphical indicators, the plurality of subsets of graphical indicators includes at least a first subset of graphical indicators included in a first set of the graphical indicators and a second subset of graphical indicators included in a second set of the graphical indicators, the graphical indicators in the first subset of graphical indicators each represent a quantity of an item and are arranged in a sequential order based on the quantities they represent when displayed on the one or more display devices, each subset of graphical indicators includes a corresponding plurality of graphical indicators, and each graphical indicator represents a parameter;

selecting, by the one or more processors, one graphical indicator from each set of graphical indicators, wherein the graphical indicator selected from each set of graphical indicators is also in the subset of graphical indicators in that set of graphical indicators;

causing, by the one or more processors, the selected graphical indicator from each set of graphical indicators to be indicated on the one or more display devices as being selected;

receiving, by the one or more processors, first user input information indicating whether or not a user accepts a parameter set indicated by the selected graphical indicators; and performing, by the one or more processors and responsive to receipt, by the one or more processors, of the first user input information indicating that the user accepted the parameter set indicated by the selected graphical indicators, one or more operations based on the parameters indicated by the selected graphical indicators.

16. The method of claim 15, further comprising causing the graphical indicators in the first subset of graphical indicators to be positioned along a path when displayed such that the quantities represented by the graphical indicators in the first subset of graphical indicators are arranged in ascending or descending order.

17. The method of claim 15, further comprising causing the graphical indicators in the first subset of graphical indicators to be arranged in a two-dimensional array when displayed such that the graphical indicators in the first subset of graphical indicators are displayed in multiple rows and columns, with the graphical indicators displayed in each row representing quantities that increase in value with increasing distance from a first axis and with the graphical indicators displayed in each column representing quantities that increase in value with increasing distance from a second axis, wherein the columns are arranged along the first axis and the rows are arranged along the second axis.

18. The method of claim 17 wherein multiple graphical indicators in the first subset of graphical indicators are visible in their entireties in each row and each column of the two-dimensional array.

19. The method of claim 15, wherein the graphical indicators in the first subset of graphical indicators are arranged in a circular array when displayed, with the quantities represented by the graphical indicators in the circular array increasing in a clockwise or counterclockwise manner.

20. The method of claim 15, wherein the first subset of graphical indicators includes all of the graphical indicators in the first set of graphical indicators.

* * * * *